United States Patent
Yanagi et al.

(10) Patent No.: US 12,471,984 B2
(45) Date of Patent: Nov. 18, 2025

(54) TREATMENT TOOL, METHOD OF MANUFACTURING TREATMENT TOOL, AND METHOD OF REPROCESSING TREATMENT TOOL

(71) Applicant: OLYMPUS CORPORATION, Hachioji (JP)

(72) Inventors: Daisuke Yanagi, Tokyo (JP); Ojiro Kitamura, Tokyo (JP); Yuki Kawaguchi, Koshu (JP); Sho Ogawa, Tokyo (JP); Akira Miyazaki, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 745 days.

(21) Appl. No.: 17/889,878

(22) Filed: Aug. 17, 2022

(65) Prior Publication Data
US 2022/0395319 A1    Dec. 15, 2022

Related U.S. Application Data

(63) Continuation of application No. PCT/JP2020/006917, filed on Feb. 20, 2020.

(51) Int. Cl.
*A61B 18/14* (2006.01)
*A61B 17/00* (2006.01)
(Continued)

(52) U.S. Cl.
CPC .......... *A61B 18/1447* (2013.01); *A61B 2017/00477* (2013.01); *A61B 2017/2927* (2013.01);
(Continued)

(58) Field of Classification Search
CPC .... A61B 2017/2901; A61B 2017/2927; A61B 2017/2929; A61B 2017/2944; A61B 18/1142; A61B 18/1445
See application file for complete search history.

(56) References Cited

U.S. PATENT DOCUMENTS

| | | |
|---|---|---|
| 2006/0173450 A1 | 8/2006 | Shibata |
| 2019/0059989 A1* | 2/2019 | Heiliger ............ A61B 17/2909 |
| 2019/0110806 A1 | 4/2019 | Benk |

FOREIGN PATENT DOCUMENTS

| | | |
|---|---|---|
| JP | 2004-081873 A | 3/2004 |
| JP | 2006-212109 A | 8/2006 |

OTHER PUBLICATIONS

May 26, 2020 International Search Report issued in Patent Application No. PCT/JP2020/006917.

\* cited by examiner

*Primary Examiner* — Linda C Dvorak
*Assistant Examiner* — Bradford C. Blaise
(74) *Attorney, Agent, or Firm* — Oliff PLC

(57) ABSTRACT

A treatment tool includes: a sheath; a treatment portion that is capable of treating a living tissue and is provided at a distal end of the sheath; a first driver and a second driver that are inserted in the sheath and are capable of driving the treatment portion; and a holder that is inserted in the sheath, and holds the first driver and the second driver. The holder includes a groove in which the first and second driver are inserted, and an intervening portion provided in the groove and arranged between the first driver and the second driver in a cross section perpendicular to a longitudinal direction of the groove that extends from a distal end to a proximal end of the holder.

13 Claims, 25 Drawing Sheets

(51) Int. Cl.
    *A61B 17/29*          (2006.01)
    *A61B 18/00*          (2006.01)
(52) U.S. Cl.
    CPC ............... *A61B 2017/2944* (2013.01); *A61B 2018/00178* (2013.01); *A61B 2018/00589* (2013.01)

TREATMENT TOOL, METHOD OF MANUFACTURING TREATMENT TOOL, AND METHOD OF REPROCESSING TREATMENT TOOL

CROSS-REFERENCE TO RELATED APPLICATION

This application is a continuation of International Application No. PCT/JP2020/006917, filed on Feb. 20, 2020, the entire contents of which are incorporated herein by reference.

BACKGROUND

1. Technical Field

The present disclosure relates to a treatment tool, a method of manufacturing the treatment tool, and a method of reprocessing the treatment tool.

2. Related Art

In the related art, a treatment tool for treating a site to be treated (hereinafter referred to as a target site) in a living tissue is known.

A treatment tool (high frequency incision tool for endoscope) includes a treatment portion (high frequency electrode) that treats the target site, a sheath (flexible sheath) provided with the treatment portion at its distal end, a driver (electrically conductive wire) that is inserted into the sheath and drives the treatment portion, and a holder (fixing portion) that is inserted into the sheath and holds the driver. Here, the holder is provided with a groove that extends from its distal end to proximal end, and through which the driver is inserted. The driver is inserted into the groove.

SUMMARY

In some embodiments, a treatment tool includes: a sheath; a treatment portion that is capable of treating a living tissue, and is provided at a distal end of the sheath; a first driver and a second driver that are inserted in the sheath, and are capable of driving the treatment portion; and a holder that is inserted in the sheath, and holds the first driver and the second driver. The holder includes a groove in which the first driver and the second driver are inserted, and an intervening portion provided in the groove and arranged between the first driver and the second driver in a cross section perpendicular to a longitudinal direction of the groove that extends from a distal end to a proximal end of the holder.

In some embodiments, a method of manufacturing a treatment tool is provided. The method includes: setting a state in which the first driver and the second driver are inserted in the groove and an intervening portion is arranged between the first driver and the second driver in a cross section perpendicular to a longitudinal direction of the groove; and inserting the holder into the sheath.

In some embodiments, a method of reprocessing a treatment tool is provided. The method includes: removing the holder from an inside of the sheath; detaching the first driver and the second driver from the groove in which the first driver and the second driver are inserted in a state in which an intervening portion is arranged between the first driver and the second driver in a cross section perpendicular to a longitudinal direction of the groove, the first driver and the second driver being detached in order from a side close to an opening of the groove; and replacing the holder with another holder.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, modes for carrying out the disclosure (hereinafter referred to as embodiments) will be described with reference to the drawings. Note that the disclosure is not limited by the embodiments described below.

Figure 1:
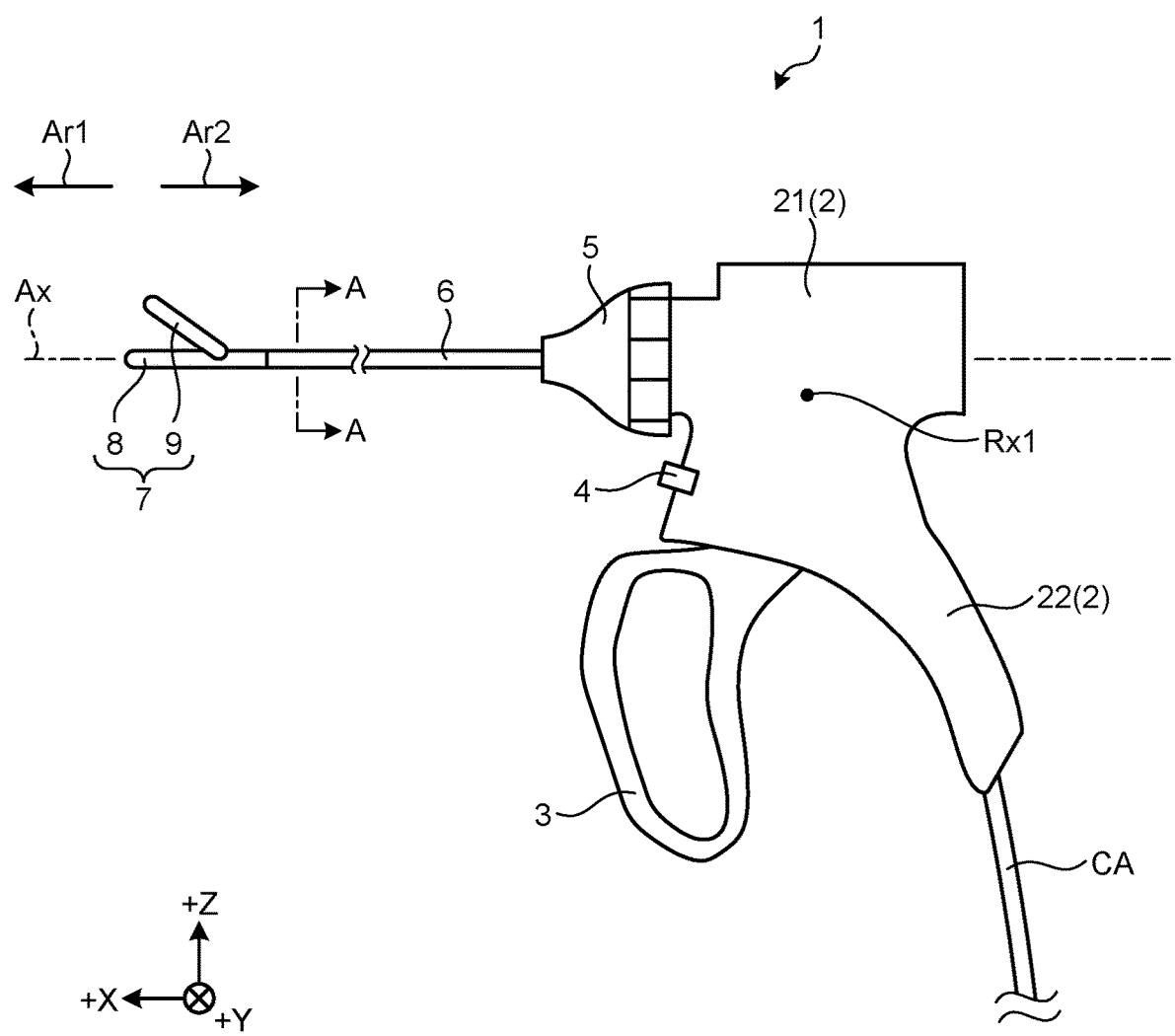
FIG. 1 is a diagram illustrating a configuration of a treatment tool according to an exemplary embodiment.
Figure 2:
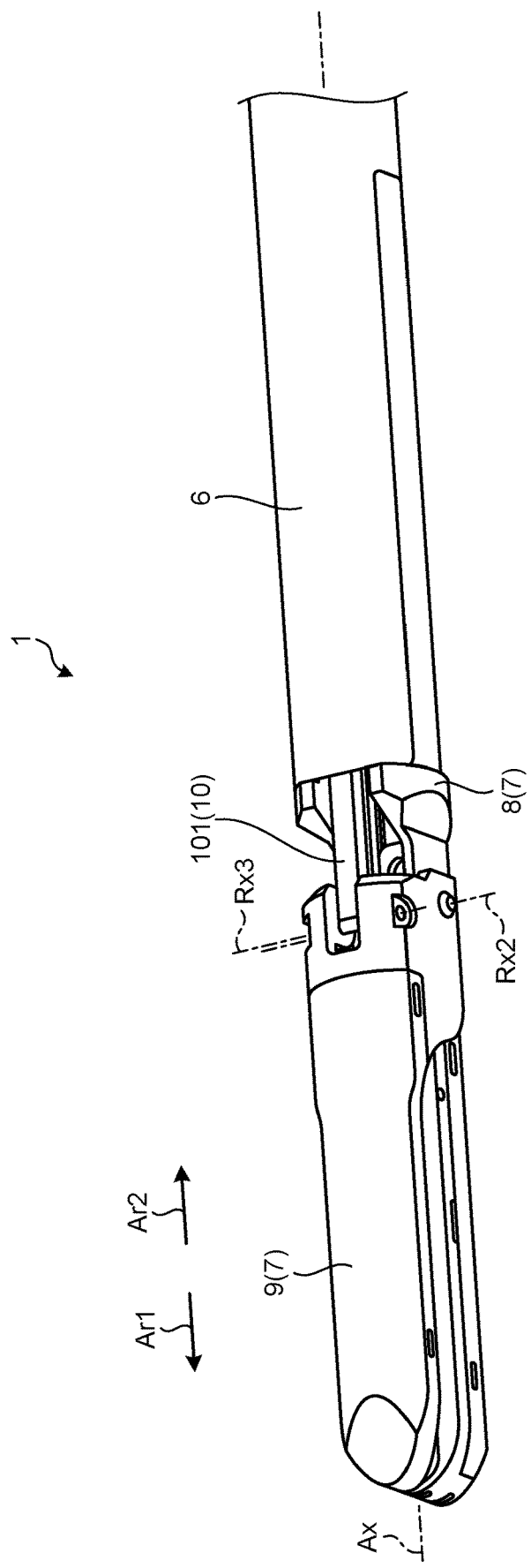
FIG. 2 is a diagram illustrating a distal end portion of the treatment tool.
Figure 3:
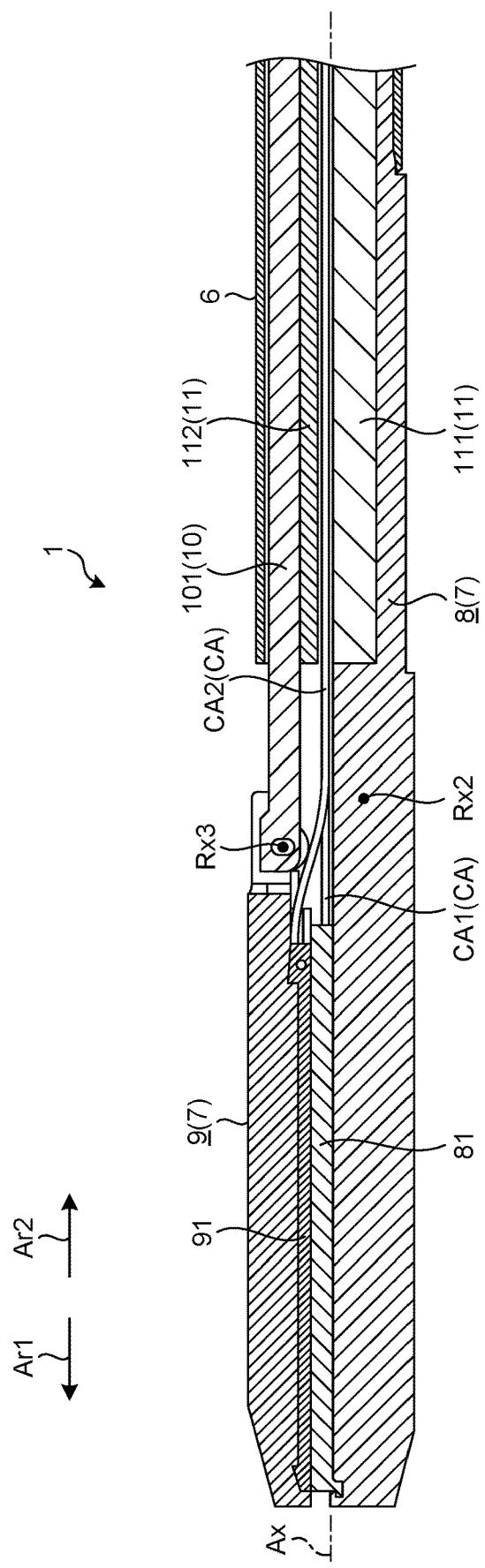
FIG. 3 is a diagram illustrating the distal end portion of the treatment tool.

Further, in the description of the drawings, the same parts are given the same reference numerals.
Configuration of Treatment Tool FIG. 1 is a diagram illustrating a configuration of a treatment tool 1 according to an exemplary embodiment. FIGS. 2 and 3 are diagrams illustrating a distal end portion of the treatment tool 1. Specifically, FIG. 2 is a perspective view illustrating the distal end portion of the treatment tool 1. FIG. 3 is a sectional view of the distal end portion of the treatment tool 1 taken along a plane including a central axis Ax of a sheath 6.

In FIG. 1, XYZ coordinate axes of an X axis, a Y axis, and a Z axis orthogonal to each other are used. The X axis is an axis parallel to the central axis Ax (FIG. 1) of the sheath 6. The Y axis is an axis orthogonal to a paper surface of FIG. 1. The Z axis is an axis in a vertical direction in FIG. 1. Hereinafter, one side (+X-axis side) along the central axis Ax is referred to as a distal end side Ar1, and the other side (−X-axis side) is referred to as a proximal end side Ar2.

The treatment tool 1 treats a treatment target site (hereinafter referred to as a target site) by applying treatment energy to the target site in a living tissue. As the treatment, coagulation and incision of the target site can be exemplified. As illustrated in FIGS. 1 to 3, the treatment tool 1 includes a housing 2 (FIG. 1), a movable handle 3 (FIG. 1), a switch 4 (FIG. 1), a rotary knob 5 (FIG. 1), the sheath 6, an end effector 7 (first and second grippers 8 and 9), an electric cable CA (first and second electrically conductive wires CA1 and CA2 (FIG. 3)), an opening and closing mechanism 10 (transmission shaft 101 (FIGS. 2 and 3)), and a holder 11 (FIG. 3).

The housing 2 supports the entire treatment tool 1. As illustrated in FIG. 1, the housing 2 includes a substantially cylindrical housing body 21 coaxial with the central axis Ax, and a fixed handle 22 extending downward in FIG. 1 from the housing body 21 and gripped by an operator.

The movable handle 3 is pivotally supported to the housing 2 so as to be rotatable about a first rotation axis Rx1 (FIG. 1) parallel to the Y axis. The movable handle 3 receives a closing operation and an opening operation by the operator. The closing operation is an operation to rotate the movable handle 3 about the first rotation axis Rx1 in a direction approaching the fixed handle 22. The opening operation is an operation to rotate the movable handle 3 about the first rotation axis Rx1 in a direction away from the fixed handle 22.

As illustrated in FIG. 1, the switch 4 is provided in a state of being exposed to an outside from a side surface of the fixed handle 22 on the distal end side Ar1, and receives an output start operation by the operator. The output start operation is an operation to press the switch 4, and is an operation of starting application of treatment energy to the target site. The switch 4 outputs an operation signal corresponding to the output start operation to an external controller (not illustrated) via the electric cable CA.

The rotary knob 5 has a substantially cylindrical shape extending along the central axis Ax, and is supported by the housing body 21 so as to be rotatable about the central axis Ax in a posture coaxial with the central axis Ax. The rotary knob 5 receives a rotating operation by the operator. By the rotating operation, the rotary knob 5 rotates about the central axis Ax with respect to the housing body 21.

The sheath 6 has a substantially cylindrical shape as a whole. As illustrated in FIGS. 1 to 3, the end effector 7 is provided at an end portion of the sheath 6 on the distal end side Ar1. Further, an end portion of the sheath 6 on the proximal end side Ar2 is inserted into the rotary knob 5, and is fixed to an inner surface of the rotary knob 5 by welding or the like. In other words, the sheath 6 and the end effector 7 rotate about the central axis Ax together with the rotary knob 5 in response to the rotating operation of the rotary knob 5 by the operator.

The end effector 7 corresponds to a treatment portion. As illustrated in FIGS. 1 to 3, the end effector 7 includes the first and second grippers 8 and 9. The first and second grippers 8 and 9 correspond to a pair of jaws.

The first gripper 8 has an elongated shape extending along the central axis Ax. Then, an end portion of the first gripper 8 on the proximal end side Ar2 is fixed to the sheath 6 as illustrated in FIG. 2 or 3.

As illustrated in FIG. 3, a first electrode 81 configured with a conductive material is provided at an end portion, facing the second gripper 9, of the first gripper 8 on the distal end side Ar1.

The second gripper 9 has an elongated shape extending along the central axis Ax. A longitudinal length of the second gripper 9 is shorter than a longitudinal length of the first gripper 8. An end portion of the second gripper 9 on the proximal end side Ar2 is pivotally supported with respect to the first gripper 8 so as to be rotatable about the second rotation axis Rx2 (FIGS. 2 and 3). When the second gripper 9 rotates about the second rotation axis Rx2, the second gripper 9 is opened and closed with respect to the first gripper 8, and the target site can be gripped between the first and second grippers 8 and 9.

In the second gripper 9, as illustrated in FIG. 3, a second electrode 91 configured with a conductive material is provided in a portion facing the first electrode 81.

The first and second electrically conductive wires CA1 and CA2 correspond to one of a first driver and a second driver. The first and second electrically conductive wires CA1 and CA2 are electrically conductive wires configuring a part of the electric cable CA routed from an end portion of the fixed handle 22 on the −Z-axis side to inside the housing 2. Further, the first and second electrically conductive wires CA1 and CA2 are routed into the sheath 6 from the end portion of the fixed handle 22 on the −Z-axis side after passing through the housing 2 and the rotary knob 5. Then, as illustrated in FIG. 3, the first electrically conductive wire CA1 is electrically connected to the first electrode 81. On the other hand, the second electrically conductive wire CA2 is electrically connected to the second electrode 91.

Then, the external controller (not illustrated) supplies high-frequency power between the first and second electrodes 81 and 91 via the first and second electrically conductive wires CA1 and CA2 in response to the output start operation to the switch 4 by the operator. As a result, a high-frequency current flows through the target site gripped between the first and second electrodes 81 and 91. In other words, high frequency energy is applied to the target site as treatment energy. As a result, the target site is treated.

The opening and closing mechanism 10 is a mechanism that opens and closes the second gripper 9 with respect to the first gripper 8. As illustrated in FIG. 2 or 3, the opening and closing mechanism 10 includes a transmission shaft 101.

The transmission shaft 101 corresponds to the other of the first driver and the second driver. The transmission shaft 101 is an elongated portion extending along the central axis Ax, and is inserted into the sheath 6. As illustrated in FIG. 2 or 3, an end portion of the transmission shaft 101 on the distal end side Ar1 is connected to the second gripper 9 so as to be rotatable about a third rotation axis Rx3. The third rotation axis Rx3 is an axis substantially parallel to the second rotation axis Rx2.

Then, the transmission shaft 101 operates as described below according to the operation of the movable handle 3 by the operator.

The transmission shaft 101 receives a pressing force (a driving force for opening and closing the second gripper 9 with respect to the first gripper 8) toward the distal end side Ar1 according to the closing operation of the movable handle 3 by the operator. In addition, the transmission shaft 101 moves toward the distal end side Ar1 along the central axis Ax by the pressing force. Then, the transmission shaft 101 applies the driving force to the second gripper 9. As a result, the second gripper 9 rotates about the second rotation axis Rx2 in a direction approaching the first gripper 8 (closing direction).

On the other hand, when the operator performs the opening operation on the movable handle 3, the transmission shaft 101 moves in a direction opposite to the above direction. As a result, the second gripper 9 rotates about the second rotation axis Rx2 in a direction away from the first gripper 8 (opening direction).

As described above, the second gripper 9 is opened and closed with respect to the first gripper 8 according to the operation of the movable handle 3 by the operator.

The holder 11 holds the first and second electrically conductive wires CA1 and CA2 and the transmission shaft 101, and is inserted into the sheath 6. In the present embodiment, the holder 11 is configured with a material having higher rigidity than those of the first and second electrically conductive wires CA1 and CA2 and having electrical insulation (e.g., resin material). Hereinafter, a configuration of the holder 11 will be detailed.

Configuration of Holder

Figure 4:
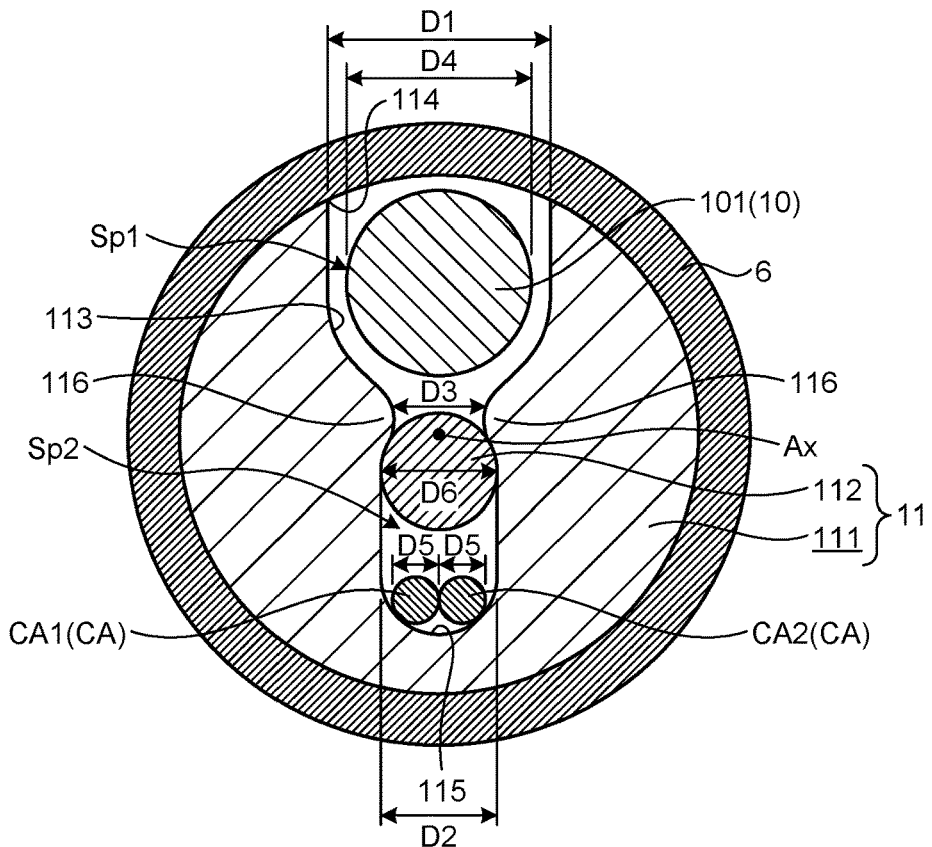
FIG. 4 is a diagram illustrating a configuration of a holder.

FIG. 4 is a diagram illustrating the configuration of the holder 11. Specifically, FIG. 4 is a sectional view taken along line A-A in FIG. 1.

As illustrated in FIG. 3 or 4, the holder 11 includes a base body 111 and an intervening portion 112.

The base body 111 corresponds to a first portion. The base body 111 is a cylindrical portion having an outer diameter slightly smaller than an inner diameter dimension of the sheath 6, and a length of the base body 111 in a direction along the central axis Ax is set to be substantially the same as that of the sheath 6.

The base body 111 is provided with a groove 113 (FIG. 4). The base body 111 has substantially the same cross-sectional shape over the entire length (the entire length in the direction along the central axis Ax). In other words, the groove 113 extends from a distal end of the base body 111 to a proximal end of the base body 111.

As illustrated in FIG. 4, the groove 113 has first and second regions Sp1 and Sp2 in a cross section perpendicular to the central axis Ax (the longitudinal direction of the groove 113).

The first region Sp1 is a region communicating with outside through an opening 114 (FIG. 4) of the groove 113. In addition, the first region Sp1 is a region whose maximum width is a first width D1 (FIG. 4).

The second region Sp2 is a region closer to a bottom 115 (FIG. 4) of the groove 113 than the first region Sp1. In addition, the second region Sp2 is a region whose maximum width is a second width D2 (FIG. 4) smaller than the first width D1.

Further, on inner wall surfaces of the groove 113 facing each other, protrusions 116 (FIG. 4) are provided at a position between the first and second regions Sp1 and Sp2, and the protrusions 116 protrude in directions approaching each other.

A distance D3 (FIG. 4) between distal ends of the pair of protrusions 116 is set to be smaller than the second width D2. Further, distal end surfaces of the pair of protrusions 116 are configured with curved surfaces that smoothly connect inner wall surfaces forming the first region Sp1 and inner wall surfaces forming the second region Sp2.

Here, in a cross section perpendicular to the central axis Ax, the transmission shaft 101 has a larger area among areas of the first and second electrically conductive wires CA1 and CA2 and the transmission shaft 101, as illustrated in FIG. 4. Thus, the transmission shaft 101 is arranged in the first region Sp1. On the other hand, the first and second electrically conductive wires CA1 and CA2 are arranged in the second region Sp2.

In a cross section perpendicular to the central axis Ax, a maximum width D4 of the transmission shaft 101 is smaller than the first width D1 and larger than the distance D3. In the cross section perpendicular to the central axis Ax, a maximum value D5 of widths of the first and second electrically conductive wires CA1 and CA2 is smaller than the distance D3.

The intervening portion 112 corresponds to an intervening portion. In the present embodiment, the intervening portion 112 is separate from the base body 111. In other words, the intervening portion 112 corresponds to a second portion. The intervening portion 112 is a cylindrical portion having a diameter D6 (FIG. 4) slightly smaller than the second width D2 and larger than the distance D3, and a length in a direction along the central axis Ax is set to be substantially the same as that of the base body 111. As illustrated in FIG. 4, the intervening portion 112 is arranged between the first and second electrically conductive wires CA1 and CA2 and the transmission shaft 101 by being arranged in the second region Sp2.

Method of Manufacturing Treatment Tool

Next, a method of manufacturing the treatment tool 1 will be described.

Figure 5:
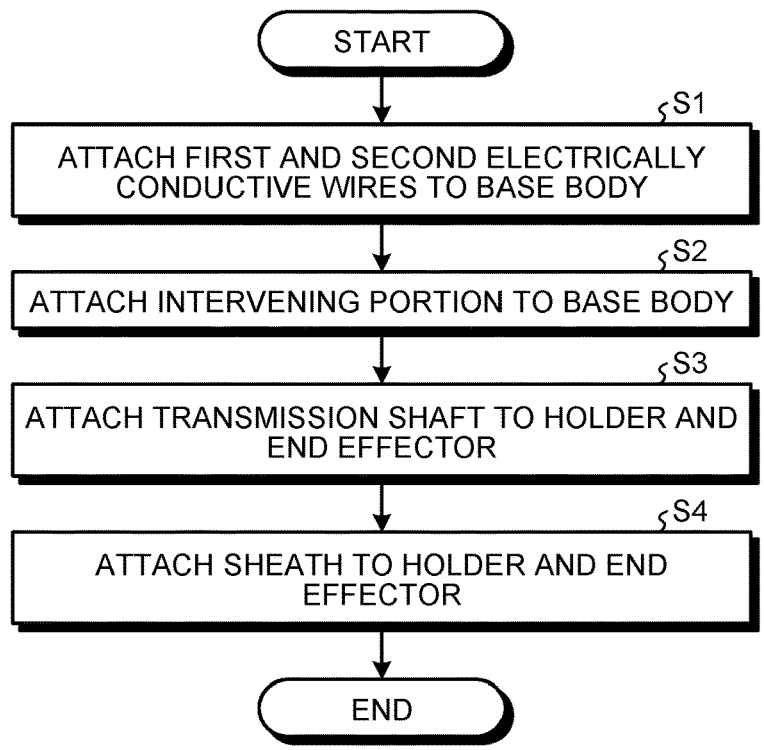
FIG. 5 is a flowchart illustrating a method of manufacturing the treatment tool.

FIG. 5 is a flowchart illustrating the method of manufacturing the treatment tool 1.

In the following, for convenience of description, the first and second electrically conductive wires CA1 and CA2, the transmission shaft 101, and the holder 11 will be mainly described as the method of manufacturing the treatment tool 1, a method of assembling the sheath 6, the end effector 7. In addition, it is assumed that the second gripper 9 is already assembled to the first gripper 8 so as to be rotatable about the second rotation axis Rx2. Further, it is assumed that the first and second electrically conductive wires CA1 and CA2 are already bonded to the first and second electrodes 81 and 91, respectively.

First, the worker attaches the first and second electrically conductive wires CA1 and CA2 extending from the end effector 7 (first and second electrodes 81 and 91) to the base body 111 (Step S1).

Specifically, in Step S1, the worker inserts the first and second electrically conductive wires CA1 and CA2 into the groove 113 through the opening 114 and arranges the first and second electrically conductive wires CA1 and CA2 in the second region Sp2 while keeping a posture of the first and second electrically conductive wires CA1 and CA2 in the longitudinal direction substantially parallel to the longitudinal direction of the base body 111.

After Step S1, the worker attaches the intervening portion 112 to the base body 111 (Step S2).

Specifically, in Step S2, the worker inserts the intervening portion 112 into the groove 113 through the opening 114 and brings the intervening portion 112 into contact with the pair of protrusions 116 while keeping a posture of the intervening portion 112 in the longitudinal direction substantially parallel to the longitudinal direction of the base body 111. Then, the worker presses the intervening portion 112 toward the bottom 115, and uses elastic deformation of the pair of protrusions 116 to arrange the intervening portion 112 in the second region Sp2.

After Step S2, the worker attaches the transmission shaft 101 to the holder 11 and the end effector 7 (Step S3).

Specifically, in Step S3, the worker inserts the transmission shaft 101 into the groove 113 through the opening 114 and arranges the transmission shaft 101 in the first region Sp1 while keeping a posture of the transmission shaft 101 in the longitudinal direction substantially parallel to the longitudinal direction of the base body 111. Then, the worker connects the end portion of the transmission shaft 101 on the distal end side Ar1 to the second gripper 9 so as to be rotatable about the third rotation axis Rx3.

After Step S3, the worker attaches the sheath 6 to the holder 11 and the end effector 7 (Step S4).

Specifically, in Step S4, the worker inserts an end portion of the holder 11 on the proximal end side Ar2 into the sheath 6 from the end portion of the sheath 6 on the distal end side Ar1. Then, the worker bonds the end portion of the sheath 6 on the distal end side Ar1 and the end portion of the first gripper 8 on the proximal end side Ar2.

Through the above Steps S1 to S4, the sheath 6, the end effector 7, the first and second electrically conductive wires CA1 and CA2, the transmission shaft 101, and the holder 11 are assembled.

The treatment tool 1 described above may be disposed of after a single use, or may be repeatedly used for a plurality of times. When the treatment tool 1 is configured to be repeatedly used for the plurality of times, it is necessary to remanufacture the treatment tool 1 by, for example, a reprocessing method illustrated in FIG. 6.

Hereinafter, the reprocessing method of the treatment tool 1 will be described.

Method of Reprocessing Treatment Tool

Figure 6:
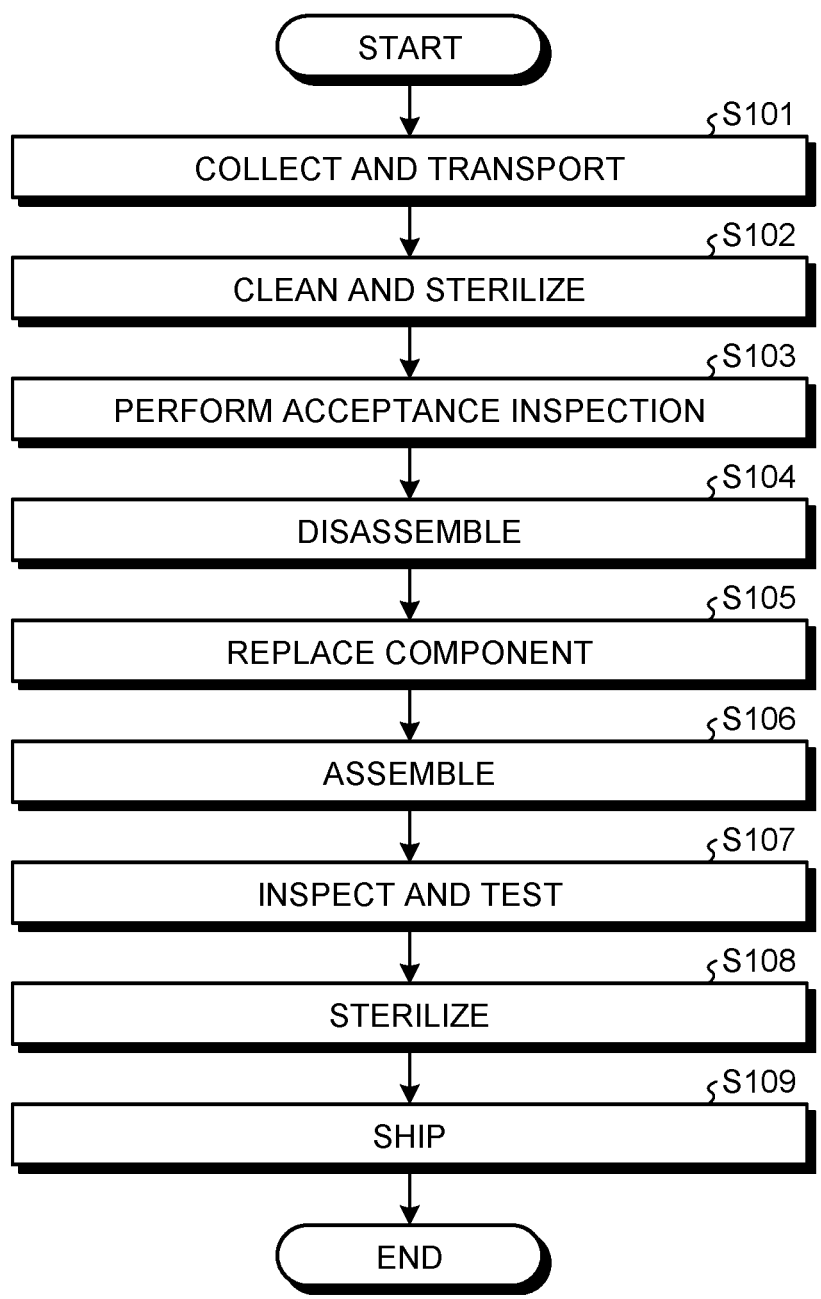
FIG. 6 is a flowchart illustrating a method of reprocessing the treatment tool.

FIG. 6 is a flowchart illustrating the reprocessing method of the treatment tool 1.

First, a manufacturer and seller who performs remanufacturing collects a used treatment tool 1 after being used for treatment and transports the used treatment tool 1 to a factory or the like (Step S101). Next, the manufacturer and seller cleans and sterilizes the used treatment tool 1 collected and transported (Step S102), and performs an acceptance inspection (Step S103). Next, the manufacturer and seller disassembles the treatment tool 1 (Step S104). Specifically, in the present embodiment, in Step S104, the manufacturer and seller performs a step of removing the holder 11 from the inside of the sheath 6, and a step of removing the transmission shaft 101 and the first and second electrically conductive wires CA1 and CA2 from the inside of the groove 113 in order from the transmission shaft 101 that is close to the opening 114. Next, the manufacturer and seller performs a step of replacing components (Step S105). Specifically, in the present embodiment, in Step S105, the manufacturer and seller replaces the holder 11 worn or stained by the treatment with a new one. Thereafter, the manufacturer and seller reassembles each component (Step S106), inspects and tests (Step S107), and sterilizes (Step S108), and then ships the tool again (Step S109).

When the holder 11 is not consumed, the holder 11 may be reused after cleaning and sterilization without replacement.

According to the present embodiment described above, the following effects are obtained.

In the treatment tool 1 according to the present embodiment, the first and second electrically conductive wires CA1 and CA2 and the transmission shaft 101 are inserted into the groove 113 of the holder 11. In the groove 113, the intervening portion 112 is provided and arranged between the first and second electrically conductive wires CA1 and CA2 and the transmission shaft 101.

Therefore, the transmission shaft 101 moving along the central axis Ax and the first and second electrically conductive wires CA1 and CA2 do not come into contact with each other in the groove 113. Thus, it is possible to avoid mutual deterioration of the transmission shaft 101 and the first and second electrically conductive wires CA1 and CA2 due to movement of the transmission shaft 101.

In addition, in the configuration adopted, the first and second electrically conductive wires CA1 and CA2 having flexibility are not directly inserted into the sheath 6, but the holder 11 is inserted into the sheath 6 after the first and second electrically conductive wires CA1 and CA2 are inserted into the groove 113 of the holder 11. Therefore, an assembly work of inserting the first and second electrically conductive wires CA1 and CA2 having flexibility into the elongated sheath 6 can be easily performed, and an increase in manufacturing cost can be suppressed. It is also possible to easily perform a disassembly work that is a work opposite to the assembly work.

In particular, in the groove 113, the first and second regions Sp1 and Sp2 are sequentially arranged from the opening 114 toward the bottom 115. In a cross sections perpendicular to the central axis Ax of the first and second electrically conductive wires CA1 and CA2 and the transmission shaft 101, a component with a larger area is arranged in the first region Sp1, and a smaller area in the second region Sp2. Therefore, the assembly work of the first and second electrically conductive wires CA1 and CA2 and the transmission shaft 101 with respect to the holder 11 can be easily performed, and the disassembly work can also be easily performed.

In addition, in the treatment tool 1 according to the present embodiment, the holder 11 includes the base body 111 and the intervening portion 112 independent from each other. Therefore, the distance D3 can be set to be larger than the maximum value D5, and the assembly work of the first and second electrically conductive wires CA1 and CA2 to the second region Sp2 can be easily performed. Still more, the disassembly work can also be easily performed.

Further, in the treatment tool 1 according to the present embodiment, the holder 11 is a portion having electrical insulation. Therefore, the holder 11 can electrically insulate the first and second electrically conductive wires CA1 and CA2 from an external portion.

Next, another exemplary embodiment will be described. In the following description, the same reference numerals are given to the same components as those of the embodiment described above, and a detailed description thereof will be omitted or simplified.

Figure 7:
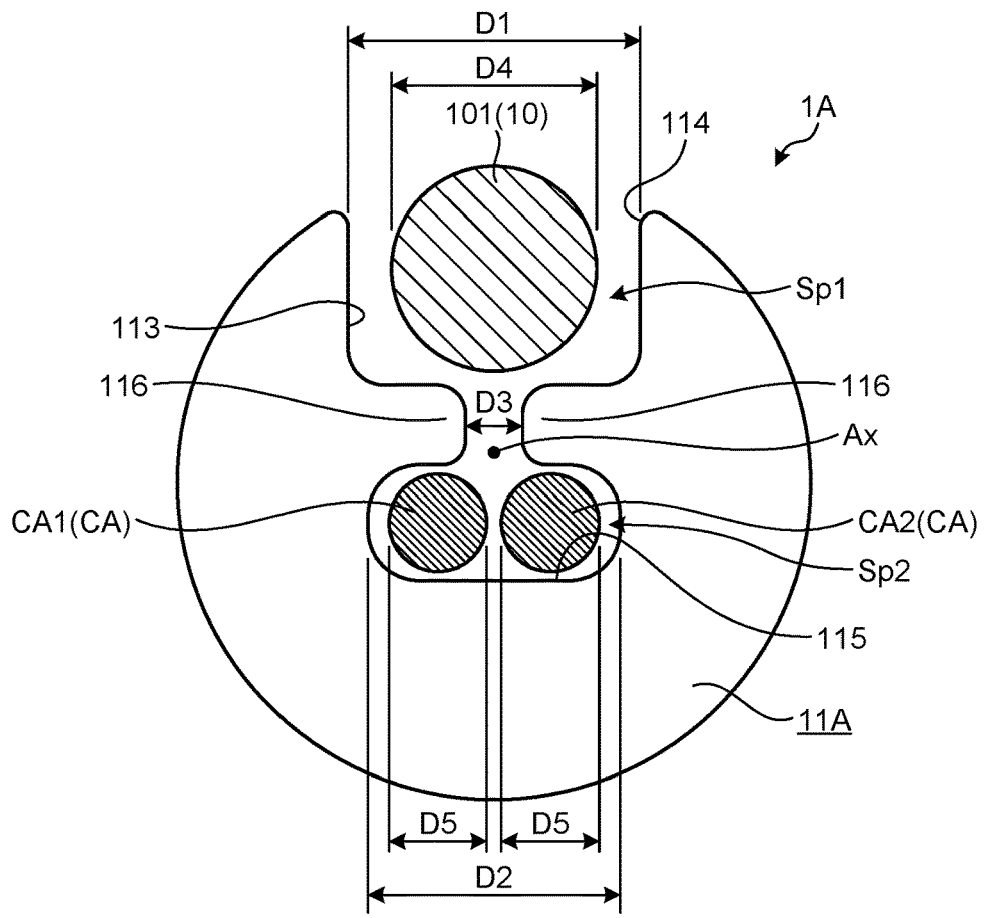
FIG. 7 is a diagram illustrating a configuration of a holder according to an exemplary embodiment.

FIG. 7 is a diagram illustrating a configuration of a holder 11A according to the this embodiment. Specifically, FIG. 7 is a sectional view corresponding to FIG. 3, and is a sectional view obtained by cutting the holder 11A along a plane orthogonal to the central axis Ax.

As illustrated in FIG. 7, a treatment tool 1A according to the present embodiment is different from the aforementioned embodiment in that the holder 11A having the configuration different from that of the holder 11 is adopted.

Configuration of Holder

As illustrated in FIG. 7, the holder 11A is not provided with the intervening portion 112 described in the aforementioned embodiment. In the holder 11A, the distance D3 is set to be smaller than the maximum value D5. The pair of protrusions 116 corresponds to the intervening portion.

Method of Manufacturing Treatment Tool

Next, a method of manufacturing the treatment tool 1A will be described.

Figure 8:
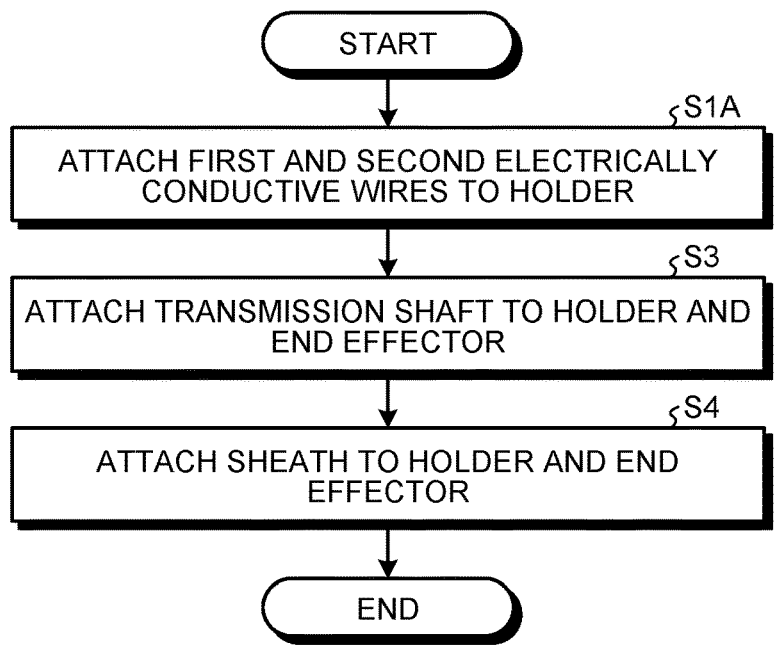
FIG. 8 is a flowchart illustrating a method of manufacturing a treatment tool.

FIG. 8 is a flowchart illustrating the method of manufacturing the treatment tool 1A.

As illustrated in FIG. 8, the method of manufacturing the treatment tool 1A according to the present embodiment is different from the method of manufacturing the treatment tool 1 described in the above embodiment (FIG. 5) in that Step S2 is omitted and Step S1A is adopted instead of Step S1. Therefore, only Step S1A will be described below.

In Step S1A, the worker attaches the first and second electrically conductive wires CA1 and CA2 bonded to the first and second electrodes 81 and 91, respectively, and extending from the first and second electrodes 81 and 91, respectively, to the holder 11.

Specifically, in Step S1A, the worker inserts the first and second electrically conductive wires CA1 and CA2 into the groove 113 through the opening 114 and brings the first and second electrically conductive wires CA1 and CA2 into contact with the pair of protrusions 116 while keeping a posture of the first and second electrically conductive wires CA1 and CA2 in the longitudinal direction substantially parallel to the longitudinal direction of the holder 11A. Then, the worker presses the first and second electrically conductive wires CA1 and CA2 toward the bottom 115, and uses elastic deformation of the pair of protrusions 116 to arrange the first and second electrically conductive wires CA1 and CA2 in the second region Sp2.

Thereafter, the worker performs Step S3.

Note that a reprocessing method of the treatment tool 1A according to the present embodiment is similar to the reprocessing method (FIG. 6) of the treatment tool 1 described in the above embodiment described above, and thus the description thereof will be omitted.

According to the present embodiment described above, the following effects are obtained in addition to the same effects as those of the above embodiment described above.

In the holder 11A according to the present embodiment, the intervening portion 112 is omitted, and the pair of protrusions 116 functions as the intervening portion. In other words, since the number of components is reduced and the number of steps is reduced, the disassembly work and the assembly work can be more easily performed.

Next, another exemplary embodiment will be described.

In the following description, the same reference numerals are given to the same components as those of the embodiment described above, and a detailed description thereof will be omitted or simplified.

Figure 9:
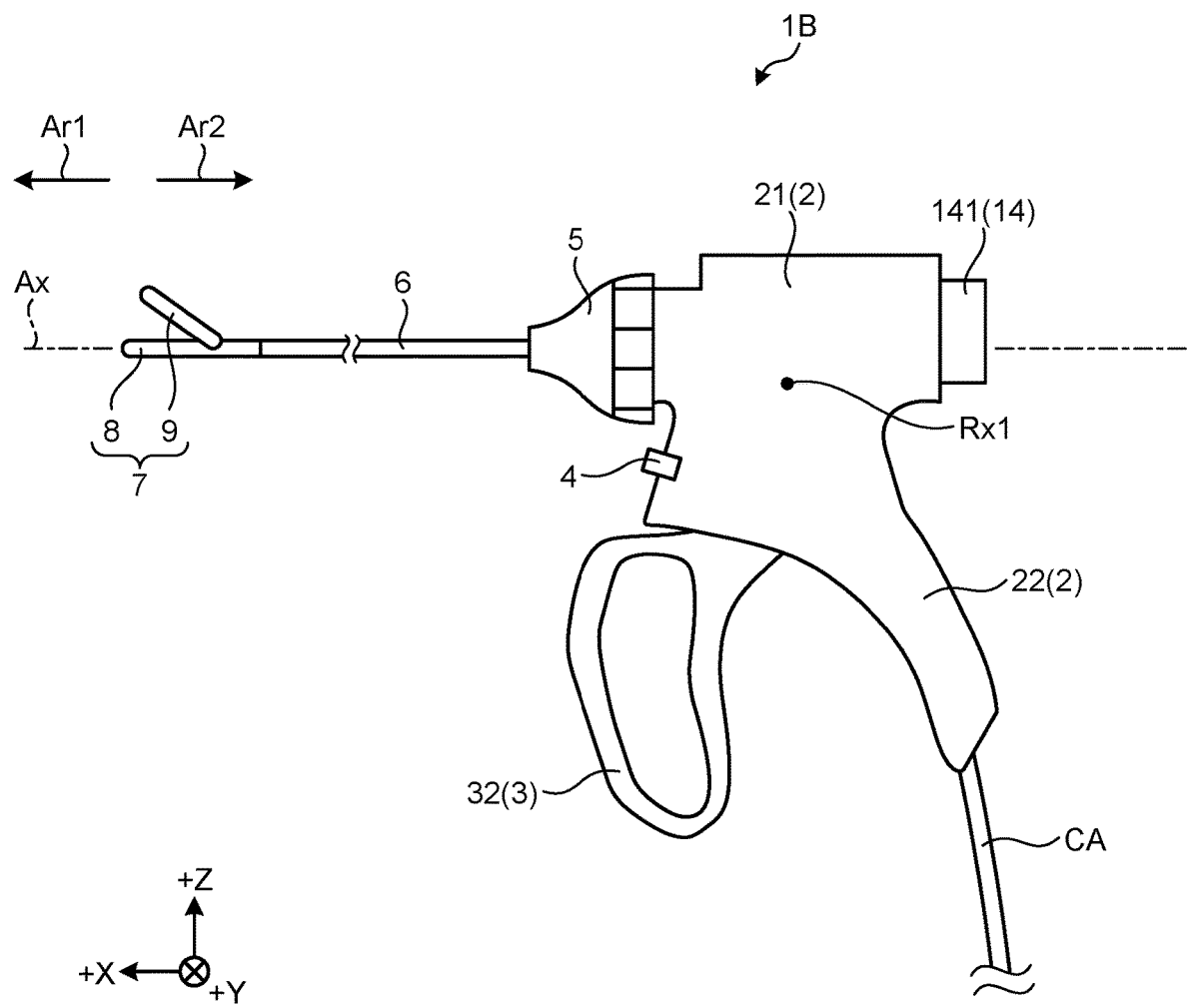
FIG. 9 is a diagram illustrating a configuration of a treatment tool according to an exemplary embodiment.
Figure 10:
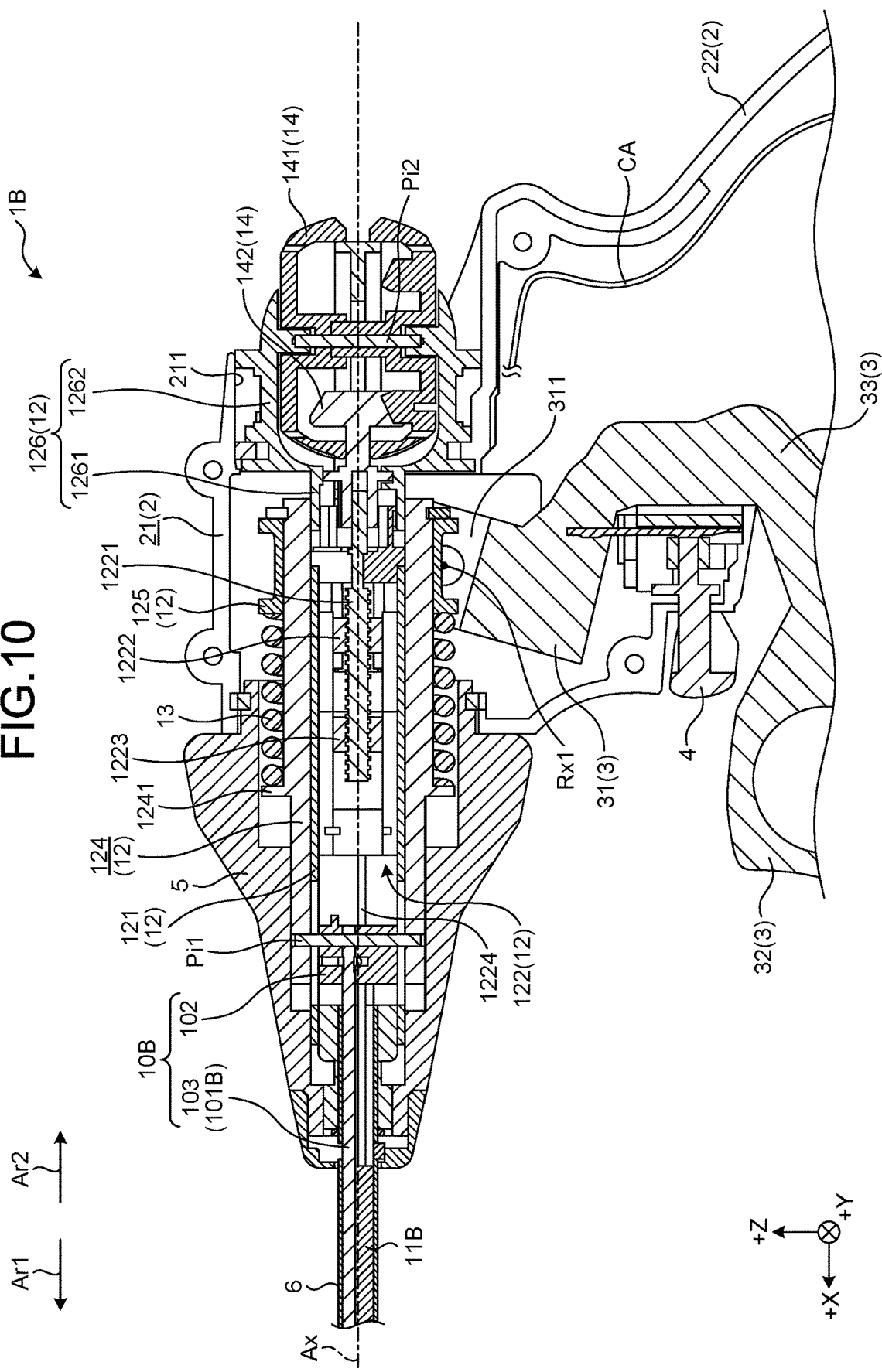
FIG. 10 is a diagram illustrating the configuration of the treatment tool.
Figure 11:
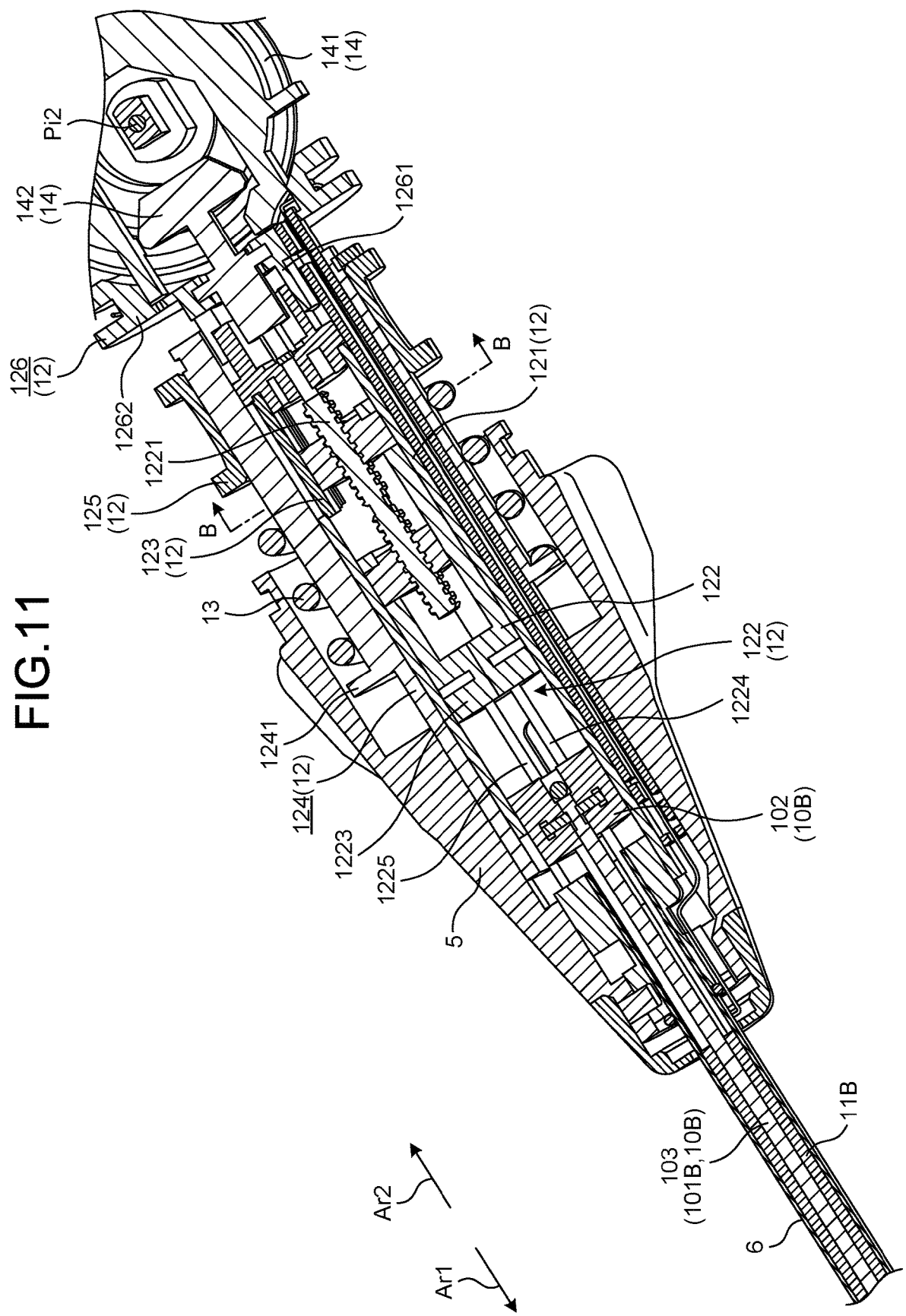
FIG. 11 is a diagram illustrating the configuration of the treatment tool.
Figure 12:
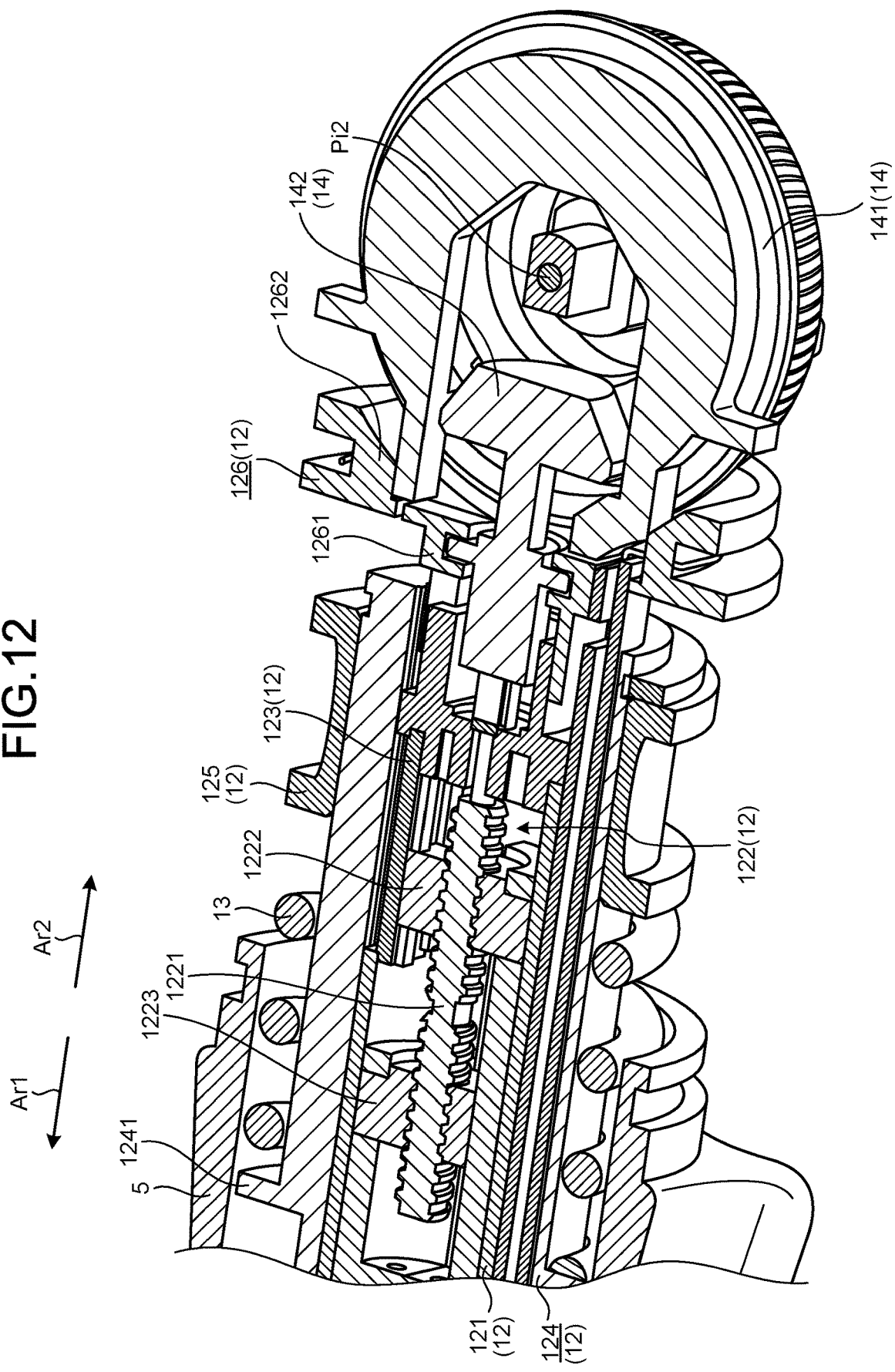
FIG. 12 is a diagram illustrating the configuration of the treatment tool.
Figure 13:
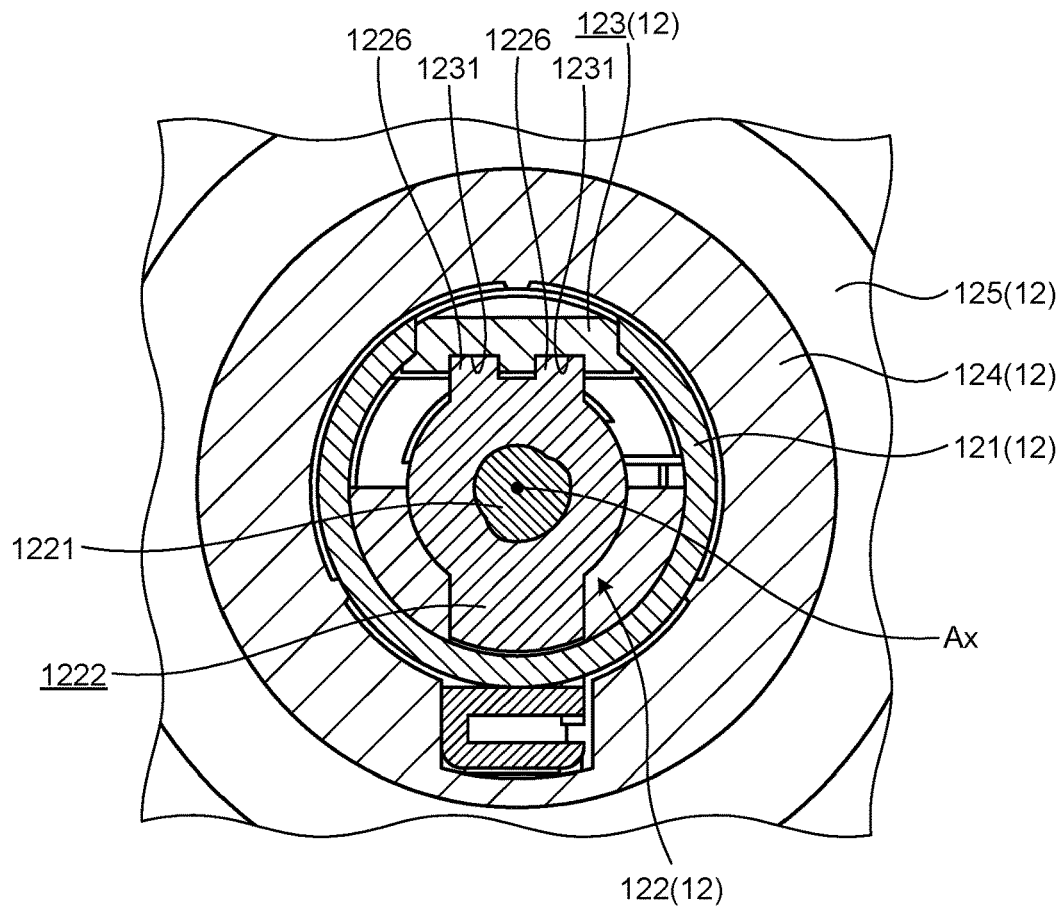
FIG. 13 is a diagram illustrating the configuration of the treatment tool.
Figure 14:
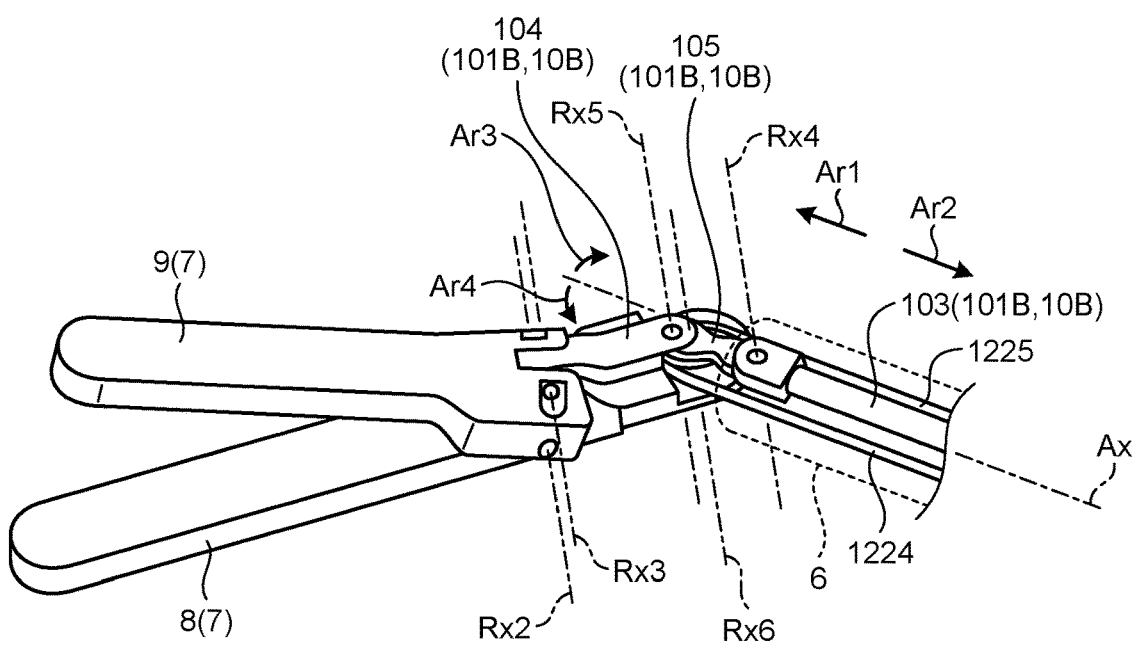
FIG. 14 is a diagram illustrating the configuration of the treatment tool.

FIGS. 9 to 14 are diagrams illustrating a configuration of a treatment tool 1B according to the present embodiment. Specifically, FIG. 9 is a diagram illustrating an overall configuration of the treatment tool 1B. FIGS. 10 to 12 are diagrams illustrating a configuration inside the housing 2. FIG. 13 is a sectional view taken along line B-B in FIG. 11. FIG. 14 is a diagram illustrating a distal end portion of the treatment tool 1B.

In FIGS. 9 and 10, XYZ coordinate axes are used as in FIG. 1. In FIG. 14, for convenience of explanation, illustration of the first and second electrodes 81 and 91 is omitted.

As illustrated in FIGS. 9 to 14, the treatment tool 1B according to the present embodiment is partially different in a configuration from the treatment tool 1 described in the aforementioned above embodiment.

Configuration of Treatment Tool

As illustrated in FIGS. 9 to 14, the treatment tool 1B includes the housing 2 (FIG. 9, FIG. 10), the movable handle 3 (FIG. 9, FIG. 10), the switch 4 (FIG. 9, FIG. 10), the rotary knob 5 (FIGS. 9 to 12), the sheath 6 (FIGS. 9 to 11 and 14), the end effector 7 (FIG. 9, FIG. 14), the electric cable CA (FIG. 9, FIG. 10), a holder 11B (FIG. 10, FIG. 11), a rotating portion 12 (FIGS. 10 to 13), a coil spring 13 (FIGS. 10 to 12), and a bending operating unit 14 (FIGS. 9 to 12).

Since the configurations of the housing 2, the switch 4, the rotary knob 5, the sheath 6, and the end effector 7 have been described in the embodiment described above, the description thereof will be omitted.

As illustrated in FIG. 9 or 10, the movable handle 3 includes a handle base 31 (FIG. 10), a handle body 32, and a handle connecting portion 33 (FIG. 10).

The handle base 31 is located in the housing 2. A portion of the handle base 31 on a +Z axis side (upper side in FIG. 10) is pivotally supported to the housing 2 so as to be rotatable about the first rotation axis Rx1 (FIG. 9, FIG. 10). Further, a pair of engaging portions 311 (FIG. 10) is provided at an end portion of the handle base 31 on the +Z axis side. The engaging portions protrude toward the +Z axis side in a bifurcated state and face each other along the Y axis direction in a state of sandwiching a slider 125 (FIG. 10) configuring the rotating portion 12. The pair of engaging portions 311 are portions engaged with the slider 125. In FIG. 10, out of the pair of engaging portions 311, only the engaging portion 311 in the +Y-axis direction (the back side of a paper sheet of FIG. 10) is illustrated.

The handle body 32 is a portion that receives a closing operation and an opening operation by an operator, and is located outside the housing 2 as illustrated in FIG. 9 or 10.

As illustrated in FIG. 10, the handle connecting portion 33 is a portion that is disposed across the inside and the outside of the housing 2 to connect the handle base 31 and the handle body 32.

The rotating portion 12 rotates about the central axis Ax together with the rotary knob 5 in response to a rotating operation of the rotary knob 5 by the operator. As illustrated in FIGS. 10 to 13, the rotating portion 12 includes a first support portion 121, a bending mechanism 122, a rotation restricting portion 123 (FIGS. 11 to 13), a slider receiver 124, a slider 125, an opening and closing mechanism 10B (FIG. 10 and FIG. 11), and a second support portion 126 (FIGS. 10 to 12).

As illustrated in FIGS. 10 to 13, the first support portion 121 has a cylindrical shape extending along the central axis Ax and is disposed in a posture coaxial with the central axis Ax. More specifically, the first support portion 121 is inserted into the rotary knob 5 and the housing body 21 in a state of straddling the rotary knob 5 and the housing body 21. An end portion of the first support portion 121 on the distal end side Ar1 is fixed to the inner surface of the rotary knob 5 by welding or the like. In other words, the first support portion 121 rotates about the central axis Ax together with the rotary knob 5 in response to the rotating operation of the rotary knob 5 by the operator.

The first support portion 121 described above supports a part of the bending mechanism 122 and a part of the opening and closing mechanism 10B inside the rotary knob 5.

Configurations of the bending mechanism 122 and the rotation restricting portion 123 will be described together with a configuration of the bending operating unit 14.

As illustrated in FIGS. 10 to 13, the slider receiver 124 has a cylindrical shape extending along the central axis Ax and is disposed in a posture coaxial with the central axis Ax. More specifically, the slider receiver 124 is inserted into the coil spring 13, and is disposed so as to be movable along central axis Ax with respect to the first support portion 121 in a state that the first support portion 121 is inserted into the slider receiver 124. Here, an end portion of the slider receiver 124 on the distal end side Ar1 is fixed to the opening and closing mechanism 10B held inside the first support portion 121 by a first pin Pi1 (FIG. 10) in a state that movement along the central axis Ax with respect to the first support portion 121 is permitted and rotation about the central axis Ax is restricted. In other words, the slider receiver 124 rotates about the central axis Ax together with the rotary knob 5 and the first support portion 121 according to the rotating operation of the rotary knob 5 by the operator.

As illustrated in FIGS. 10 to 12, the slider receiver 124 is provided with an overhanging portion 1241 that protrudes from an outer peripheral surface and extends over the entire circumference in a circumferential direction surrounding the central axis Ax.

As illustrated in FIGS. 10 to 13, the slider 125 has a substantially cylindrical shape extending along the central axis Ax, and is disposed in a posture coaxial with the central axis Ax. More specifically, the slider 125 is disposed so as to be movable along the central axis Ax with respect to the slider receiver 124 in a state that the slider receiver 124 is inserted in the slider 125. As described above, the slider 125 is engaged with the movable handle 3 by the pair of engaging portions 311.

Here, the coil spring 13 has a function of applying a driving force to the second gripper 9 in the first and second grippers 8 and 9 configuring the end effector 7 according to the closing operation and the opening operation of the movable handle 3 by the operator. The driving force is a driving force for opening and closing the second gripper 9 with respect to the first gripper 8. As illustrated in FIGS. 10 to 12, the coil spring 13 is disposed such that the slider receiver 124 is inserted in the coil spring 13 and sandwiched between the overhanging portion 1241 and the slider 125.

As illustrated in FIG. 10, FIG. 11, or FIG. 14, the opening and closing mechanism 10B includes a transmission shaft 101B having a configuration different from the transmission shaft 101 described in the aforementioned embodiment, and an opening and closing connection portion 102.

As illustrated in FIG. 10, the opening and closing connection portion 102 is a portion fixed to the slider receiver 124 by the first pin Pi1, and is held inside the first support portion 121 so as to be movable along the central axis Ax.

As illustrated in FIG. 10, 11, or 14, the transmission shaft 101B includes a transmission shaft body 103, a relay portion 104 (FIG. 14), and a first link mechanism 105 (FIG. 14).

The transmission shaft body 103 has the same shape as the transmission shaft 101 described in the aforementioned embodiment, and is inserted into the sheath 6. As illustrated in FIG. 10 or 11, an end portion of the transmission shaft body 103 on the proximal end side Ar2 protrudes to the outside of the sheath 6, is inserted into the first support portion 121, and is fixed to the opening and closing connection portion 102. In other words, the transmission shaft body 103 is movable along the central axis Ax together with the opening and closing connection portion 102.

As illustrated in FIG. 14, the relay portion 104 is located on the distal end side Ar1 with respect to the sheath 6 (transmission shaft body 103), and is connected to the second gripper 9 so as to be rotatable about the third rotation axis Rx3.

The first link mechanism 105 is a mechanism that causes the transmission shaft 101B in conjunction with a bending operation, described later, of the end effector 7 with respect to the sheath 6. More specifically, as illustrated in FIG. 14, the first link mechanism 105 is connected to an end portion of the transmission shaft body 103 on the distal end side Ar1 so as to be rotatable about a fourth rotation axis Rx4, and is connected to the relay portion 104 so as to be rotatable about a fifth rotation axis Rx5. The fourth and fifth rotation axes Rx4 and Rx5 are axes substantially parallel to a sixth rotation axis Rx6 described later. Then, the first link mechanism 105 bends the relay portion 104 with respect to the transmission shaft body 103 according to the bending operation of the end effector 7 with respect to the sheath 6.

Then, the slider 125, the slider receiver 124, and the opening and closing mechanism 10B operate as described below according to the operation of the movable handle 3 by the operator.

The slider 125 is pushed toward the distal end side Ar1 along the central axis Ax by the pair of engaging portions 311 according to the closing operation of the movable handle 3 by the operator. The slider receiver 124 receives pressing force toward the distal end side Ar1 (driving force for opening and closing the second gripper 9 with respect to the first gripper 8) via the coil spring 13, from the slider 125. Further, the opening and closing mechanism 10B moves toward the distal end side Ar1 along the central axis Ax in conjunction with the slider receiver 124. Then, the opening and closing mechanism 10B applies the driving force to the second gripper 9. As a result, the second gripper 9 rotates about the second rotation axis Rx2 (FIG. 14) in a direction approaching the first gripper 8 (closing direction).

On the other hand, when the operator performs the opening operation on the movable handle 3, the slider 125, the slider receiver 124, and the opening and closing mechanism 10B operate in a direction opposite to the above direction. As a result, the second gripper 9 rotates about the second rotation axis Rx2 in a direction away from the first gripper 8 (opening direction).

The second support portion 126 is a portion that supports the bending operating unit 14. As illustrated in FIGS. 10 to 12, the second support portion 126 includes a fitting portion 1261 and a support body 1262.

As illustrated in FIGS. 10 to 12, the fitting portion 1261 is formed in a cylindrical shape having an outer diameter substantially the same as an inner diameter of the slider receiver 124, and is coupled to the slider receiver 124 by being fitted in the slider receiver 124. In other words, the second support portion 126 rotates about the central axis Ax together with the rotary knob 5 and the slider receiver 124 according to the rotating operation of the rotary knob 5 by the operator.

As illustrated in FIGS. 10 to 12, the support body 1262 is formed in a substantially cylindrical shape having an outer diameter larger than the outer diameter of the slider receiver 124, and is integrally formed with the fitting portion 1261 in a posture coaxial with the fitting portion 1261. The support body 1262 supports the bending operating unit 14 in the support body 1262 and is exposed to the outside of the housing body 21 from a proximal end opening 211 (FIG. 10) of the housing body 21 on the proximal end side Ar2.

As illustrated in FIGS. 9 to 12, the bending operating unit 14 includes a bending body 141 and a rotation converter 142 (FIGS. 10 to 12).

As illustrated in FIGS. 9 to 12, the bending body 141 has a substantially cylindrical shape as a whole. A columnar second pin Pi2 (FIGS. 10 to 12) is inserted through the bending body 141 on a central axis. Further, the bending body 141 is supported by the second pin Pi2 inside the support body 1262 so as to be rotatable about second the pin Pi2. In this state, the bending body 141 is located on the central axis Ax. Then, the bending body 141 receives a bending operation (operation of bending the end effector 7 with respect to the sheath 6) by the operator. By the bending operation, the bending body 141 rotates about the second pin Pi2 with respect to the support body 1262.

As illustrated in FIGS. 10 to 12, the rotation converter 142 is connected to the bending body 141 and the bending mechanism 122. Then, the rotation converter 142 converts rotation about the second pin Pi2 according to the bending operation of the bending body 141 by the operator into rotation about the central axis Ax. In other words, the rotation converter 142 rotates about the central axis Ax according to the bending operation. As the rotation converter 142, a bevel gear can be exemplified.

The bending mechanism 122 is a mechanism for bending the end effector 7 with respect to the sheath 6, and includes a rotation shaft 1221, first and second drivers 1222 and 1223, and first and second drive rods 1224 and 1225 (FIG. 10, FIG. 11) as illustrated in FIGS. 10 to 13.

The rotation shaft 1221 is a cylindrical elongated portion extending along the central axis Ax, and is inserted into the first support portion 121 in a posture coaxial with the central axis Ax. An end portion of the rotation shaft 1221 on the proximal end side Ar2 is fixed to the rotation converter 142. In other words, the rotation shaft 1221 rotates about the central axis Ax together with the rotation converter 142 according to the bending operation of the bending body 141 by the operator.

The first and second drivers 1222 and 1223 are screwed to the rotation shaft 1221 by a screwing structure in which the first and second drivers 1222 and 1223 are reverse screws to each other. The first and second drivers 1222 and 1223 are supported inside the first support portion 121 so as to be movable in opposite directions along the central axis Ax in conjunction with the rotation of the rotation shaft 1221 about the central axis Ax.

The first and second drive rods 1224 and 1225 correspond to the first driver or the second driver. The first and second drive rods 1224 and 1225 are elongated portions extending along the central axis Ax, and are inserted into the sheath 6. An end portion of the first drive rod 1224 on the proximal end side Ar2 protrudes out of the sheath 6, is inserted into the first support portion 121, and is fixed to the first driver 1222. On the other hand, an end portion of the second drive rod 1225 on the proximal end side Ar2 protrudes out of the sheath 6, is inserted into the first support portion 121, and is fixed to the second driver 1223. In other words, the first and second drive rods 1224 and 1225 are movable along the central axis Ax together with the first and second drivers 1222 and 1223, and each end portion of the first and second drive rods 1224 and 1225 on the distal end side Ar1 is mechanically connected to an end portion of the end effector 7 (first gripper 8) on the proximal end side Ar2.

Here, in the end effector 7 according to the present embodiment, the end portion of the first gripper 8 on the proximal end side Ar2 is pivotally supported with respect to the sheath 6 so as to be rotatable about the sixth rotation axis Rx6 (FIG. 14). The sixth rotation axis Rx6 is an axis substantially orthogonal to the central axis Ax.

Then, the bending mechanism 122 operates as described below according to the bending operation of the bending body 141 by the operator.

When the bending body 141 is rotated (bending operation) about the second pin Pi2 in a first direction by the operator, the operating force is transmitted from the bending body 141 to the first and second drive rods 1224 and 1225 via the rotation converter 142, the rotation shaft 1221, and the first and second drivers 1222 and 1223. Then, the first drive rod 1224 moves toward the distal end side Ar1 along the central axis Ax, and pushes the end effector 7 toward the distal end side Ar1. On the other hand, the second drive rod 1225 moves toward the proximal end side Ar2 along the central axis Ax, and draws the end effector 7 toward the proximal end side Ar2. As a result, the end effector 7 rotates in the first bending direction Ar3 (FIG. 14) about the sixth rotation axis Rx6 with respect to the sheath 6. In other words, the end effector 7 performs the bending operation.

On the other hand, when the bending body 141 is rotated (bent) about the second pin Pi2 by the operator in a second direction that is a direction opposite to the first direction described above, the first and second drive rods 1224 and 1225 move in directions opposite to the above. As a result, the end effector 7 rotates with respect to the sheath 6 about the sixth rotation axis Rx6 in a second bending direction Ar4 (FIG. 14) that is a direction opposite to the first bending direction Ar3. In other words, the end effector 7 performs the bending operation.

The rotation restricting portion 123 is a portion that restricts rotation of the first driver 1222 about the central axis Ax. As illustrated in FIGS. 11 to 13, the rotation restricting portion 123 is fixed to the first support portion 121 at a position facing the first driver 1222 in the direction orthogonal to the central axis Ax. As illustrated in FIG. 13, a pair of guide grooves 1231 extending along the central axis Ax is formed on a surface of the rotation restricting portion 123 facing the first driver 1222. A pair of protrusions 1226 (FIG. 13) formed in first driver 1222 is inserted into the pair of guide grooves 1231. Then, the first driver 1222 is restricted from rotating about the central axis Ax while being allowed to move along the central axis Ax with respect to the rotation restricting portion 123. Note that the rotation of the second driver 1223 about the central axis Ax is restricted by abutting on the first driver 1222.

Figure 15:
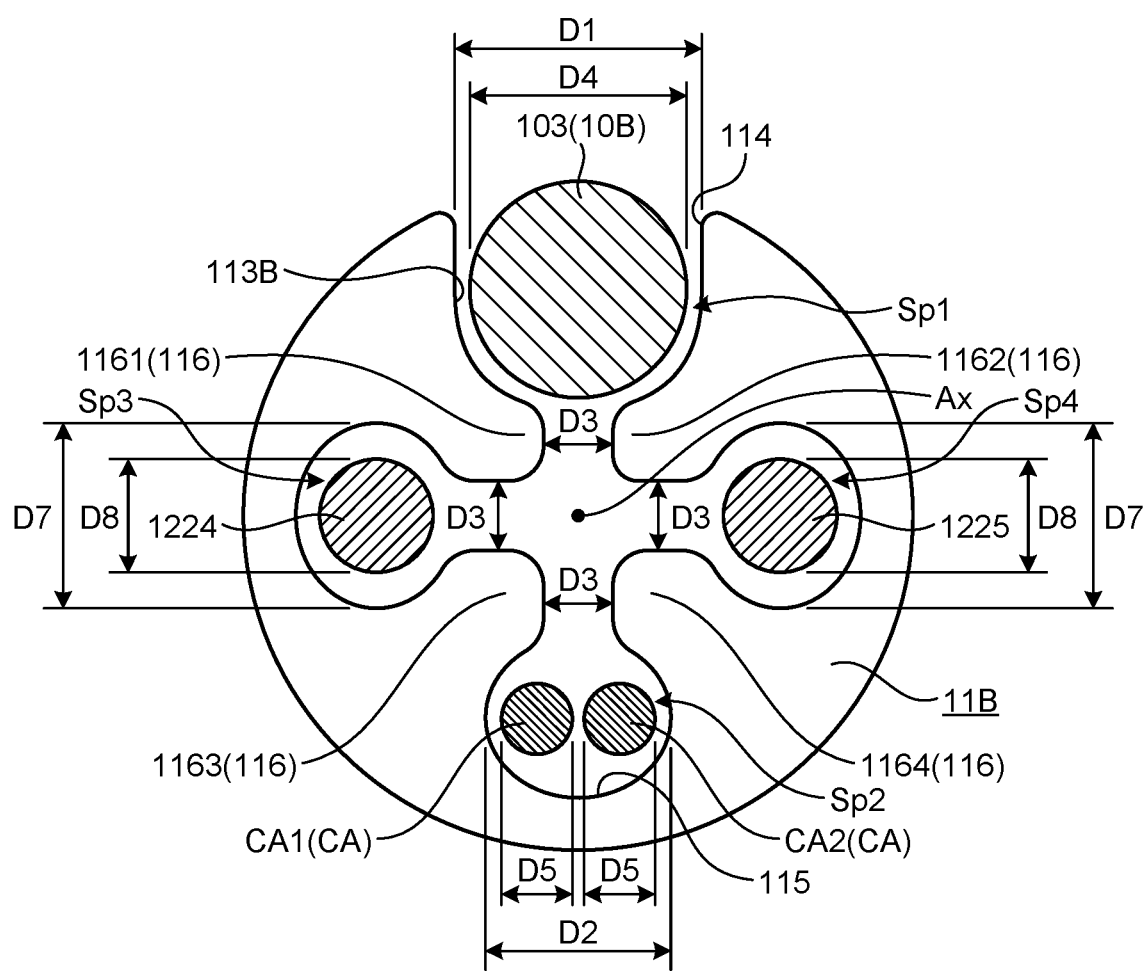
FIG. 15 is a diagram illustrating a configuration of a holder.

FIG. 15 is a diagram illustrating a configuration of the holder 11B. Specifically, FIG. 15 is a sectional view corresponding to FIG. 3, and is the sectional view obtained by cutting the holder 11B along a plane orthogonal to the central axis Ax.

As illustrated in FIG. 15, the holder 11B has a groove 113B in which third and fourth regions Sp3 and Sp4 are added to the groove 113 with respect to the holder 11A described in the aforementioned embodiment.

The third and fourth regions Sp3 and Sp4 are regions recessed in the left-right direction in FIG. 15 from ends of the pair of protrusions 116, and are wider on the back side than the opening on a tip side of the protrusions 116. More specifically, in the third and fourth regions Sp3 and Sp4, a minimum width (width of the opening) is set to be substantially the same as the distance D3, and the maximum width (width on the far side) is set to be a width D7 larger than the distance D3.

Here, in a cross section perpendicular to the central axis Ax, a maximum width D8 of the first and second drive rods 1224 and 1225 is larger than the distance D3 and smaller than the width D7.

The pair of protrusions 116 is divided into two by the third and fourth regions Sp3 and Sp4. Therefore, in the following description, the two protrusions located on the upper side of FIG. 15 will be referred to as protrusions 1161 and 1162, respectively, and the two protrusions located on the lower side of FIG. 15 will be referred to as protrusions 1163 and 1164, respectively.

Method of Manufacturing Treatment Tool

Next, a method of manufacturing the treatment tool 1B will be described.

Figure 16:
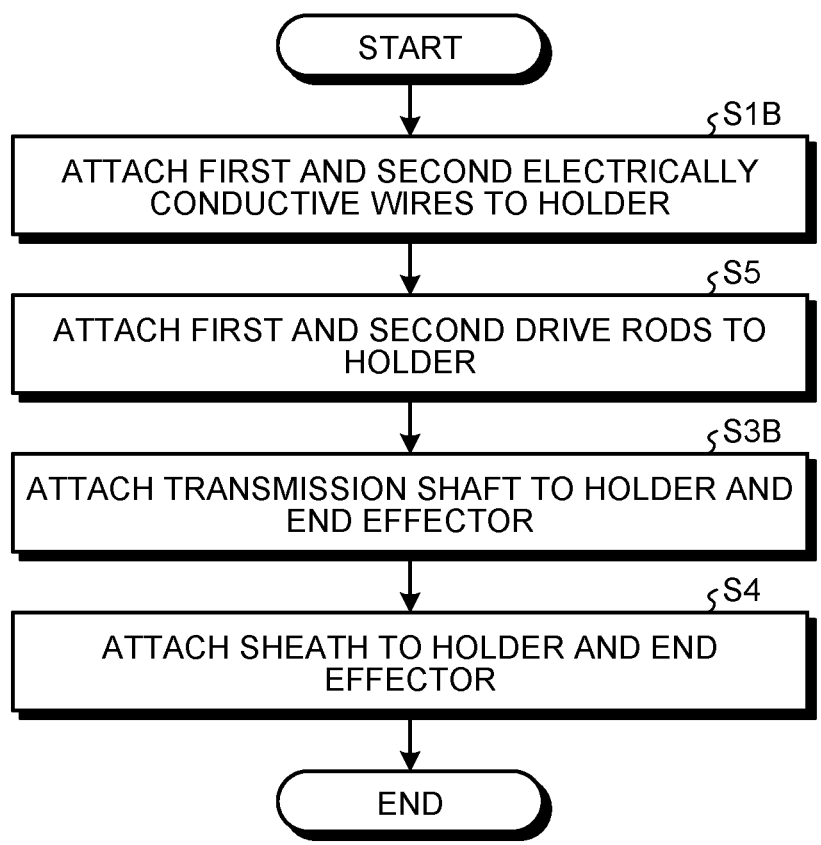
FIG. 16 is a flowchart illustrating a method of manufacturing the treatment tool.

FIG. 16 is a flowchart illustrating the method of manufacturing the treatment tool 1B.

As illustrated in FIG. 16, the method of manufacturing the treatment tool 1B according to the present embodiment is different from the method of manufacturing the treatment tool 1 described in the aforementioned embodiment (FIG. 5) in the following points. Specifically, Step S2 is not performed in the method of manufacturing the treatment tool 1B. In the method of manufacturing the treatment tool 1B, Steps S1B and S3B are adopted instead of Steps S1 and S3. Further, Step S5 is added to the method of manufacturing the treatment tool 1B. Therefore, only Steps S1B, S3B, and S5 will be described below.

In Step S1B, the worker attaches the first and second electrically conductive wires CA1 and CA2 to the holder 11B. The first and second electrically conductive wires CA1 and CA2 are bonded to the first and second electrodes 81 and 91 of the end effector 7 and extend from the first and second electrodes 81 and 91, respectively.

Specifically, in Step S1B, the worker inserts the first and second electrically conductive wires CA1 and CA2 into the groove 113B through the opening 114 and brings the first and second electrically conductive wires CA1 and CA2 into contact with the pair of protrusions 1161 and 1162 while keeping a posture of the first and second electrically conductive wires CA1 and CA2 in the longitudinal direction substantially parallel to the longitudinal direction of the holder 11B. Then, the worker presses the first and second electrically conductive wires CA1 and CA2 toward the bottom 115, and uses elastic deformation of the four protrusions 1161 to 1164 to arrange the first and second electrically conductive wires CA1 and CA2 in the second region Sp2.

After Step S1B, the worker attaches the first and second drive rods 1224 and 1225, connected to the end portion of the end effector 7 on the proximal end side Ar2 (first gripper 8) and respectively extending from the end portion, to the holder 11B (Step S5).

Specifically, in Step S5, the worker inserts the first drive rod 1224 into the groove 113B through the opening 114 and brings the first drive rod 1224 into contact with the pair of protrusions 1161 and 1162 while keeping a posture of the first drive rod 1224 in the longitudinal direction substantially parallel to the longitudinal direction of the holder 11B. Then, the worker presses the first drive rod 1224 toward the bottom 115 (lower side in FIG. 15) and then toward the third region Sp3 (left side of FIG. 15), and arranges the first drive rod 1224 in the third region Sp3 using the elastic deformation of the three protrusions 1161 to 1163. Similarly, the worker inserts the second drive rod 1225 into the groove 113B through the opening 114 and brings the second drive rod 1225 into contact with the pair of protrusions 1161 and 1162 while keeping a posture of the second drive rod 1225 in the longitudinal direction substantially parallel to the longitudinal direction of the holder 11B. Then, the worker presses the second drive rod 1225 toward the bottom 115 (lower side in FIG. 15) and then toward the fourth region Sp4 (right side of FIG. 15), and arranges the second drive rod 1225 in the fourth region Sp4 using the elastic deformation of the three protrusions 1161, 1162, and 1164.

After Step S5, the worker attaches the transmission shaft 101B to the holder 11B and the end effector 7 (Step S3B).

Specifically, in Step S3B, the worker inserts the transmission shaft body 103 into the groove 113B through the opening 114 and arranges the transmission shaft body 103 in the first region Sp1 while keeping a posture of the transmission shaft body 103 in the longitudinal direction substantially parallel to the longitudinal direction of the holder 11B. Then, the worker connects the relay portion 104 to the second gripper 9 so as to be rotatable about the third rotation axis Rx3.

After Step S3B, the worker performs Step S4.

Note that a reprocessing method of the treatment tool 1B according to the present embodiment is similar to the reprocessing method (FIG. 6) of the treatment tool 1 described in the aforementioned embodiment, and thus the description thereof will be omitted.

According to the present embodiment described above, effects similar to those of the embodiment described above are obtained.

Figure 17:
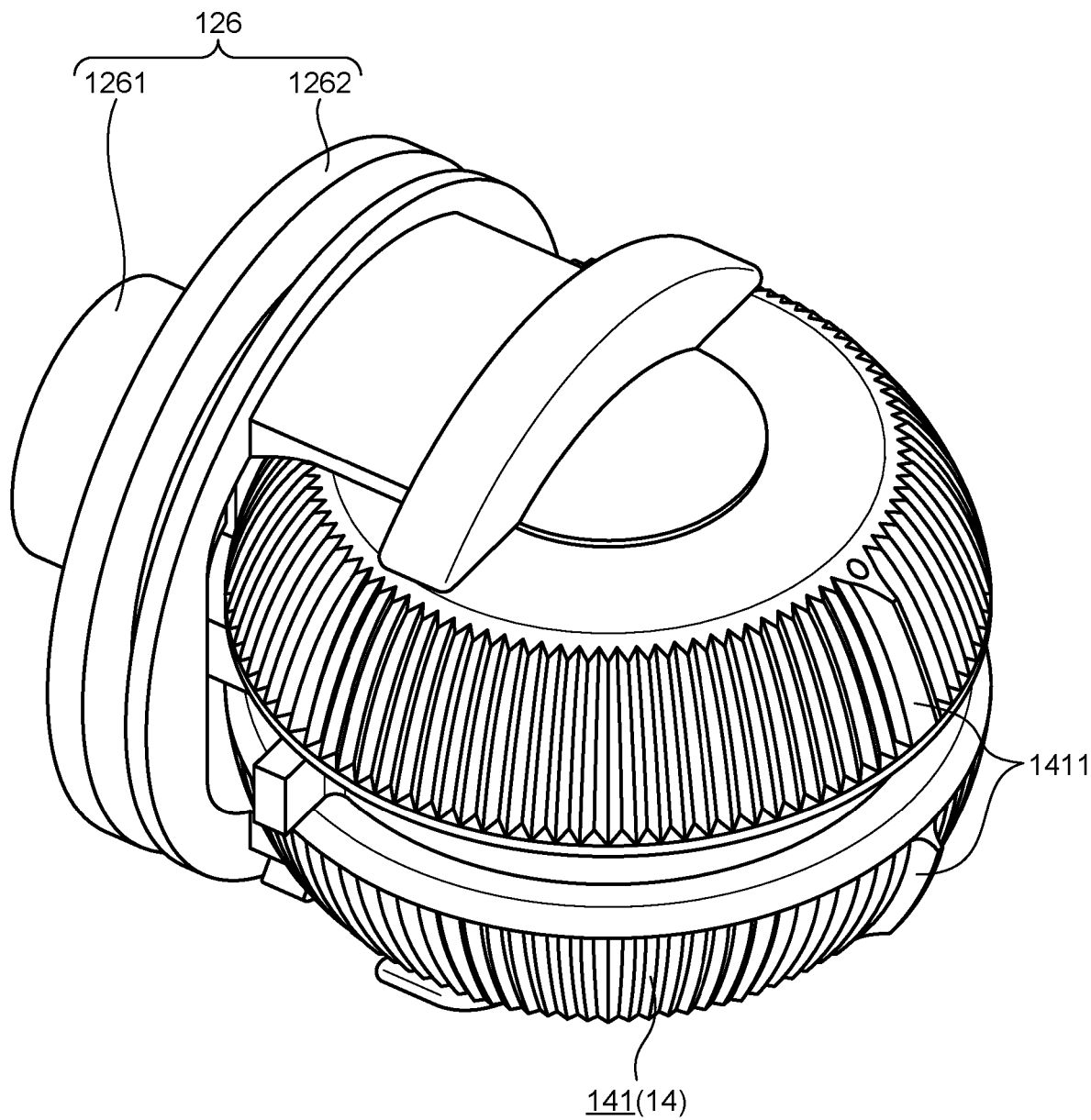
FIG. 17 is a diagram illustrating an exemplary embodiment.

FIG. 17 is a diagram illustrating a modification of the above embodiment.

As illustrated in FIG. 17, the bending body 141 in the embodiment described above may be provided with a recognizer 1411 that causes the operator to recognize a zero-degree position of the bending operation with respect to the sheath 6 by the end effector 7.

Here, the zero-degree position means a position where the end effector 7 is positioned on the central axis Ax (a position where the end effector 7 is not bent).

As illustrated in FIG. 17, the recognizer 1411 is provided on an outer peripheral surface of the bending body 141, and is configured by a protrusion having a higher protruding height than other part. In other words, the operator can recognize whether or not the end effector 7 is positioned at the zero-degree position by confirming the position of the recognizer 1411.

Figure 18:
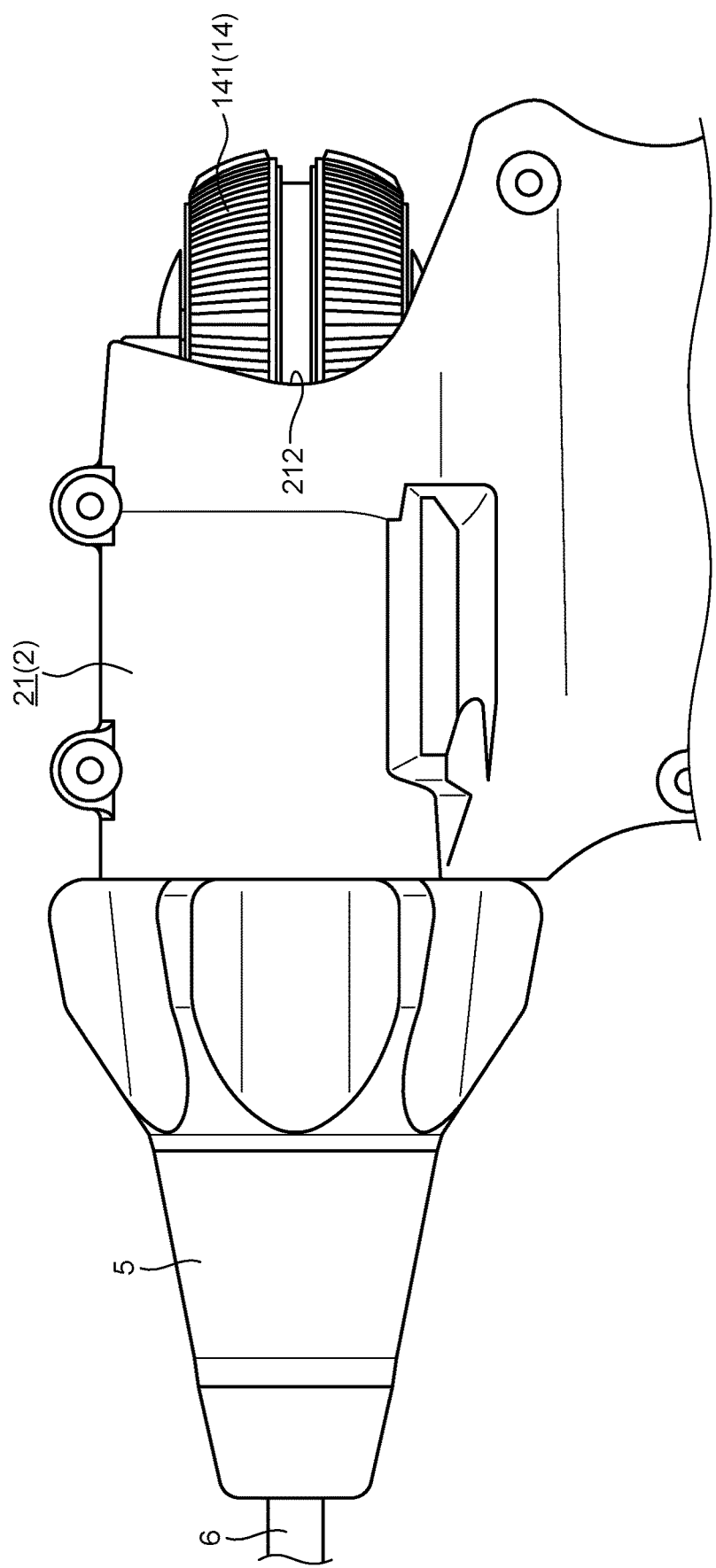
FIG. 18 is a diagram illustrating an exemplary embodiment.

FIG. 18 is a diagram illustrating another modification of the above embodiment.

As illustrated in FIG. 18, a recess 212 that is recessed toward the distal end side Ar1 may be provided in an edge portion of the proximal end opening 211 in the housing body 21 in the embodiment described above. As a result, a surface area of the bending body 141 exposed to the outside of the housing body 21 can be increased. In other words, the operability of the bending operating unit 14 by the operator can be improved.

Next, another exemplary embodiment will be described.

In the following description, the same reference numerals are given to the same components as those of the aforementioned embodiment, and the detailed description thereof will be omitted or simplified.

Figure 19:
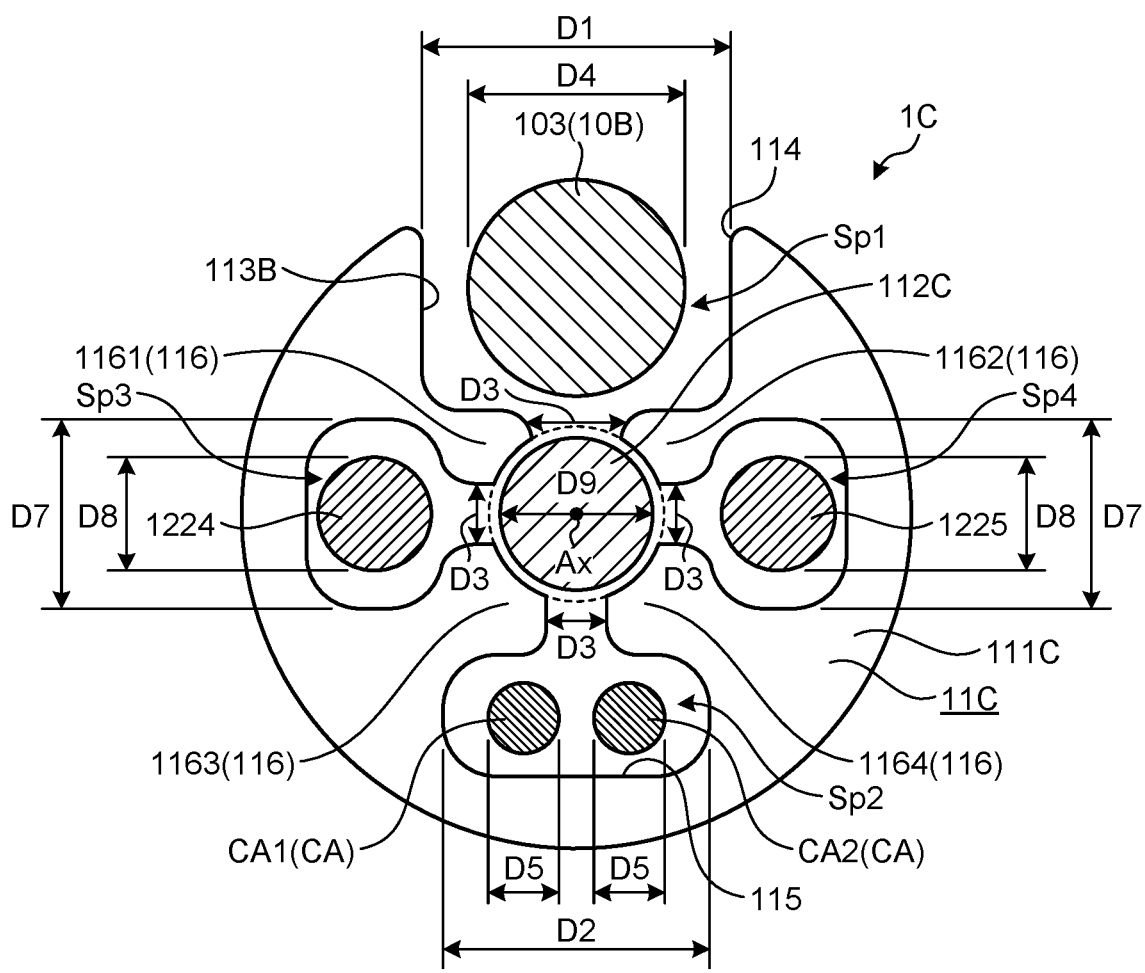
FIG. 19 is a diagram illustrating a configuration of a holder according to an exemplary embodiment.

FIG. 19 is a diagram illustrating a configuration of a holder 11C according to the present embodiment. Specifically, FIG. 19 is a sectional view corresponding to FIG. 15, and is the sectional view obtained by cutting the holder 11C along a plane orthogonal to the central axis Ax.

As illustrated in FIG. 19, a treatment tool 1C according to the present embodiment is different from the aforementioned embodiment in that the holder 11C having a configuration different from that of the holder 11B is adopted.

Configuration of Holder

As illustrated in FIG. 19, the holder 11C includes a base body 111C and an intervening portion 112C.

The base body 111C corresponds to the first portion, and has substantially the same shape as the holder 11B described in the aforementioned embodiment.

The intervening portion 112C corresponds to the intervening portion. In the embodiment discussed with respect to FIGS. 1-6, the intervening portion 112 is separate from the base body 111C. In other words, the intervening portion 112C corresponds to a second portion. The intervening portion 112C is a cylindrical portion having a diameter D9 (FIG. 19) smaller than the first width D1 and larger than the distance D3, and a length in a direction along the central axis Ax is set to be substantially the same as that of the base body 111C.

Method of Manufacturing Treatment Tool

Next, a method of manufacturing the treatment tool 1C will be described.

Figure 20:
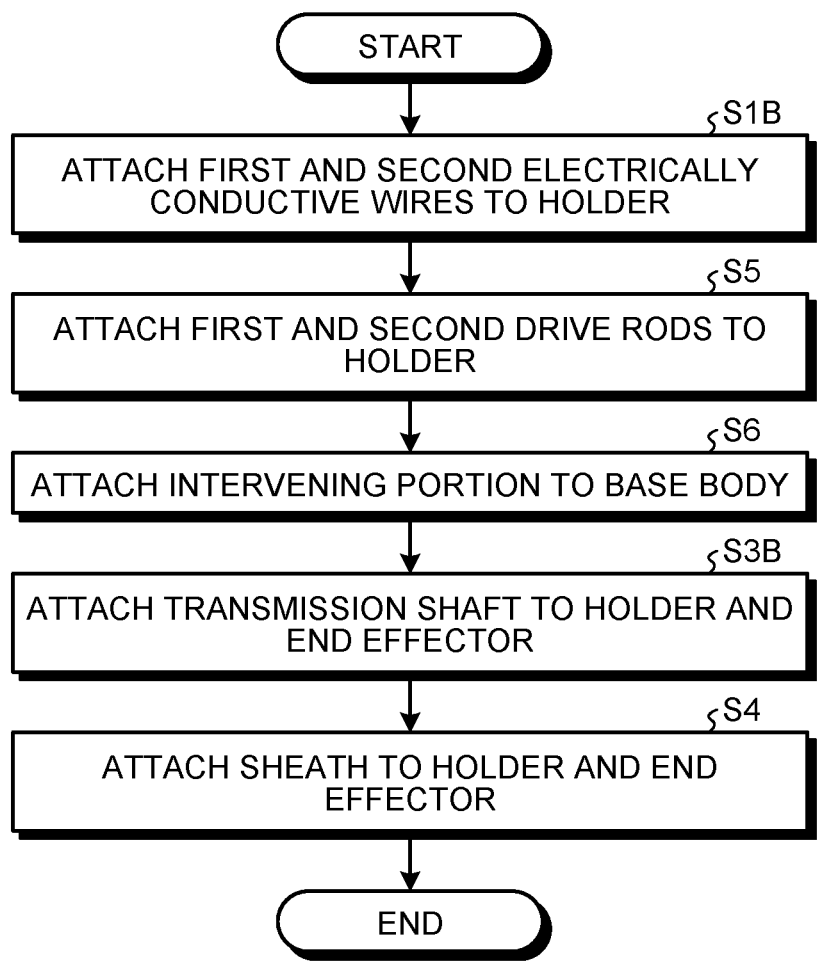
FIG. 20 is a flowchart illustrating a method of manufacturing a treatment tool.

FIG. 20 is a flowchart illustrating the method of manufacturing the treatment tool 1C.

As illustrated in FIG. 20, the method of manufacturing the treatment tool 1C according to the present embodiment is different from the method of manufacturing the treatment tool 1B described in the aforementioned embodiment (FIG. 16) in that Step S6 is added. Therefore, only Step S6 will be described below. In the method of manufacturing the treatment tool 1C according to the present embodiment, the first and second electrically conductive wires CA1 and CA2 and the first and second drive rods 1224 and 1225 are attached to the base body 111C in Steps S1B and S5.

After Step S5, the worker attaches the intervening portion 112C to the base body 111C (Step S6).

Specifically, in Step S6, the worker inserts the intervening portion 112C into the groove 113B through the opening 114 and brings the intervening portion 112C into contact with the pair of protrusions 1161 and 1162 while keeping a posture of the intervening portion 112C in the longitudinal direction substantially parallel to the longitudinal direction of the base body 111C. Then, the worker presses the intervening portion 112C toward the bottom 115, and uses the elastic deformation of the four protrusions 1161 to 1164 to dispose the intervening portion 112C at a position where adjacent protrusions in the four protrusions 1161 to 1164 are mutually blocked.

Thereafter, the worker performs Step S3B.

Note that a reprocessing method of the treatment tool 1C according to the present embodiment is similar to the reprocessing method (FIG. 6) of the treatment tool 1 described in the aforementioned embodiment, and thus the description thereof will be omitted.

Even when the holder 11C of the present embodiment described above is adopted, the same effects as those of the embodiment described above are obtained.

Next, another exemplary embodiment will be described.

In the following description, the same reference numerals are given to the same components as those of the aforementioned embodiment described with respect to FIGS. 9-14, and the detailed description thereof will be omitted or simplified.

Figure 21:
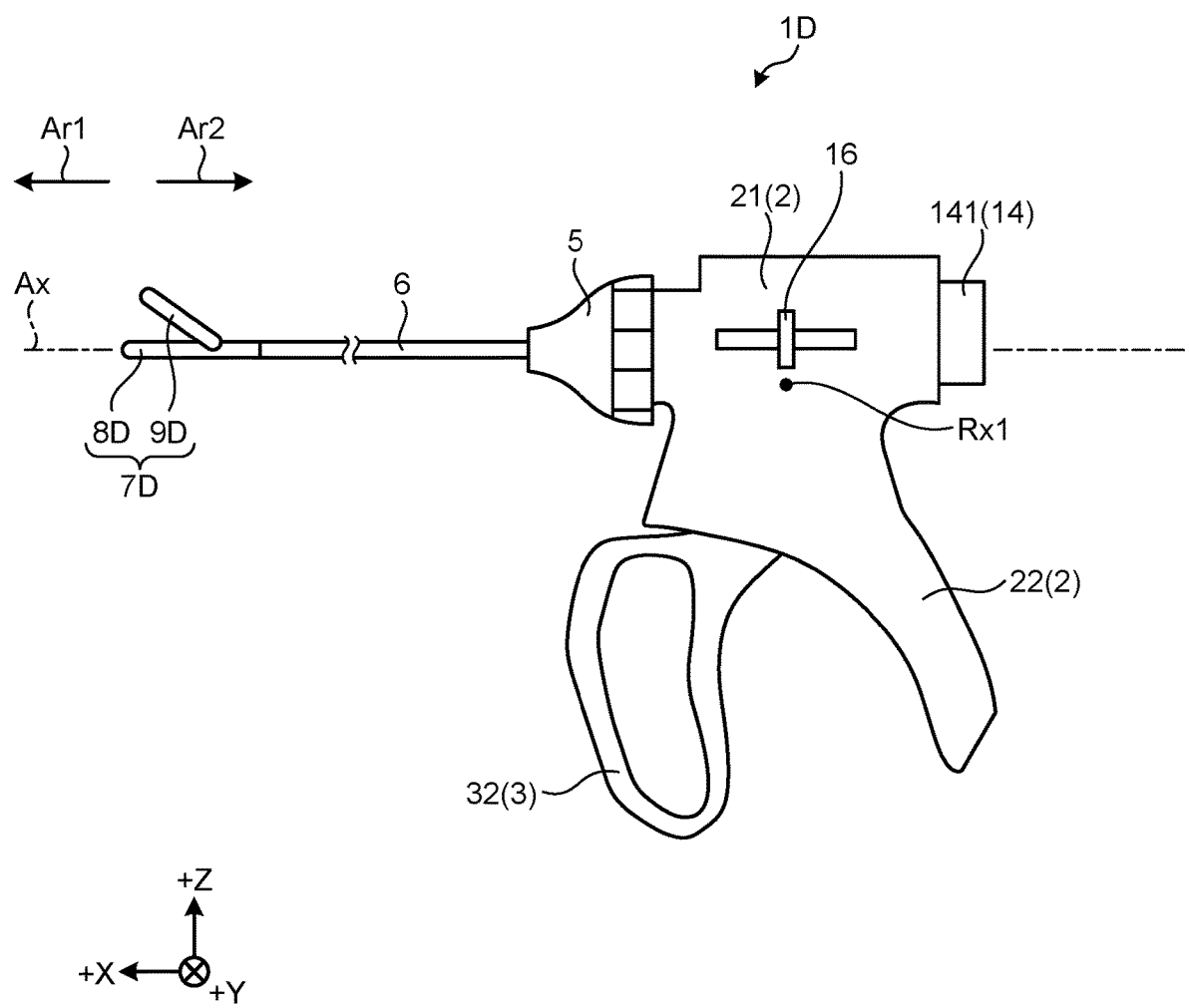
FIG. 21 is a diagram illustrating a configuration of a treatment tool according to an exemplary embodiment.
Figure 22:
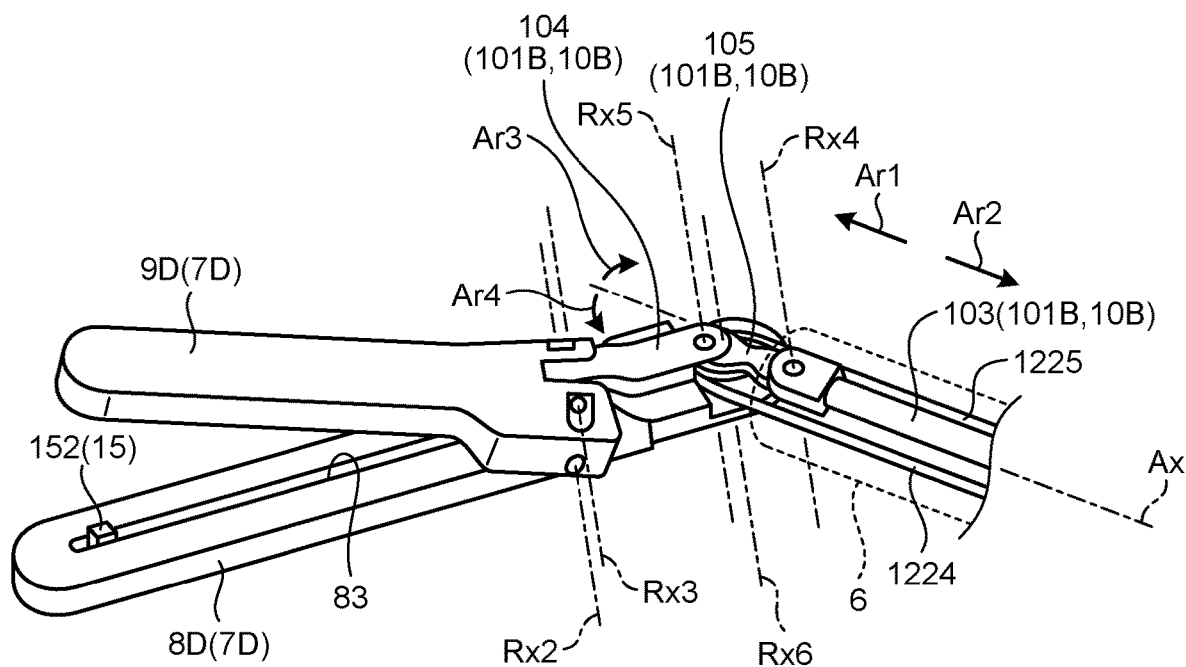
FIG. 22 is a diagram illustrating the configuration of the treatment tool.
Figure 23:
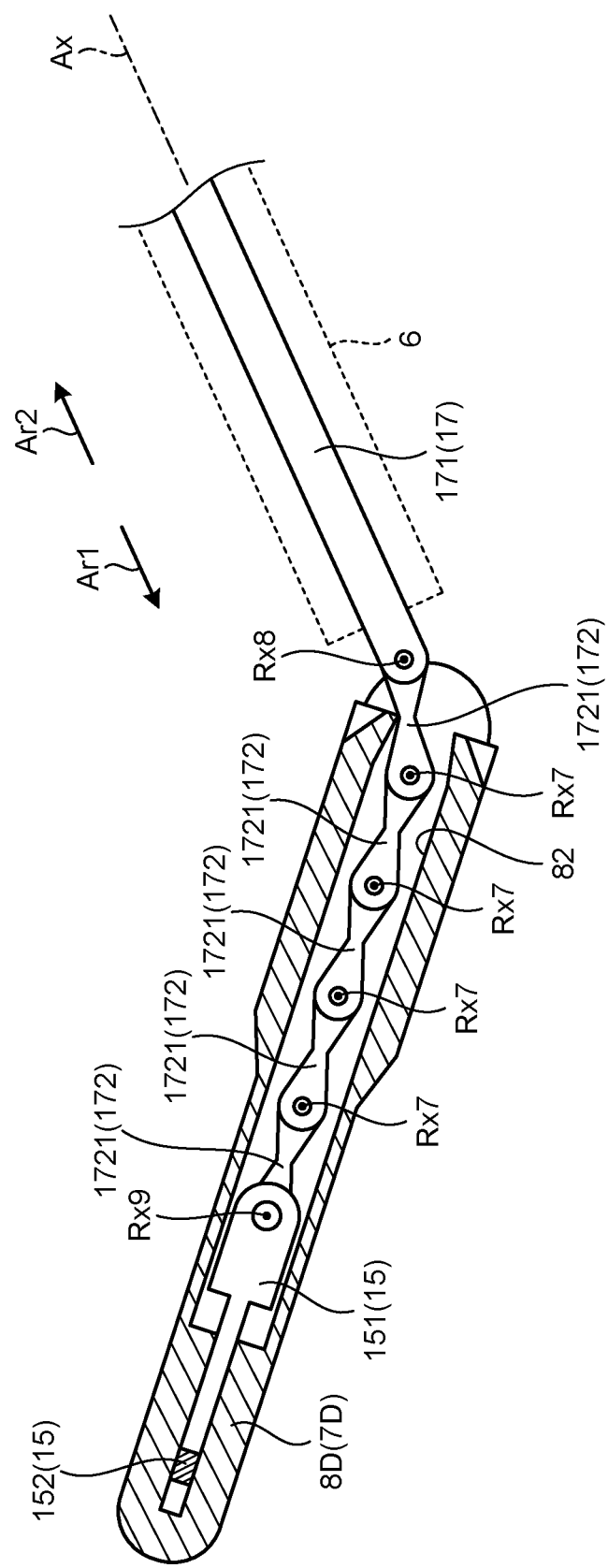
FIG. 23 is a diagram illustrating the configuration of the treatment tool.

FIGS. 21 to 23 are diagrams illustrating a configuration of a treatment tool 1D according to the present embodiment. Specifically, FIG. 21 is a diagram illustrating an overall configuration of the treatment tool 1D. FIGS. 22 and 23 are diagrams illustrating a distal end portion of the treatment tool 1D.

As illustrated in FIGS. 21 to 23, the treatment tool 1D according to the present embodiment is partially different in a configuration from the treatment tool 1B described in the aforementioned embodiment.

As illustrated in FIGS. 21 to 23, the treatment tool 1D is different from the treatment tool 1B described in the aforementioned embodiment in the following points. Specifically, an end effector 7D (FIGS. 21 to 23) having a configuration different from that of the end effector 7 is adopted as the treatment tool 1D. In addition, a cutter 15 (FIG. 22 and FIG. 23), an incision operating unit 16 (FIG. 21), and an incision mechanism 17 (FIG. 23) are added to the treatment tool 1D.

The end effector 7D corresponds to the treatment portion. As illustrated in FIGS. 21 to 23, the end effector 7D includes a first gripper 8D in which the first electrode 81 is omitted from the first gripper 8 described in the aforementioned embodiment, and a second gripper 9D in which the second electrode 91 is omitted from the second gripper 9 described in the aforementioned embodiment. In other words, in the treatment tool 1D according to the present embodiment, the switch 4 and the electric cable CA (first and second electrically conductive wires CA1 and CA2) are also omitted.

Here, as illustrated in FIG. 22 or 23, first and second guide holes 82 and 83 are formed in the first gripper 8D.

As illustrated in FIG. 23, the first guide hole 82 linearly extends, inside the first gripper 8D, from the proximal end toward the distal end side Ar1 of the first gripper 8D.

As illustrated in FIG. 22, the second guide hole 83 is a hole provided on a surface of the first gripper 8D facing the second gripper 9D and is communicating with the first guide hole 82. Similarly to the first guide hole 82, the second guide hole 83 extends linearly.

The cutter 15 corresponds to the treatment portion, and includes a cutter base 151 (FIG. 23) and a cutter blade 152 as illustrated in FIG. 22 or 23.

As illustrated in FIG. 23, the cutter base 151 is positioned in the first guide hole 82 and is configured to be movable forward and backward along an extending direction of the first guide hole 82.

As illustrated in FIG. 22 or 23, the cutter blade 152 is a blade provided at an end portion of the cutter base 151 on the distal end side Ar1, and protrudes between the first and second grippers 8D and 9D through the second guide hole 83. The cutter blade 152 is capable of incising the target site gripped between the first and second grippers 8D and 9D by moving the cutter blade 152 along the extending direction of the first guide hole 82.

The incision operating unit 16 is provided in a state of being exposed to the outside from a side surface intersecting the Y axis of the housing body 21, and is attached to the housing body 21 so as to be movable in the left-right direction in FIG. 21. Then, the incision operating unit 16 receives an incision operation (an operation of incising the target site with the cutter 15) by the operator. The incision operation is an operation of moving the incision operating unit 16 in the left-right direction in FIG. 21.

The incision mechanism 17 is a mechanism that moves the cutter 15 along the extending direction of the first guide hole 82 in response to the incision operation on the incision operating unit 16 by the operator. As illustrated in FIG. 23, the incision mechanism 17 includes a third drive rod 171 and a second link mechanism 172.

The third drive rod 171 corresponds to the first driver or the second driver. The third drive rod 171 is an elongated portion extending along the central axis Ax, and is inserted into the sheath 6. Although not specifically illustrated, an end portion of the third drive rod 171 on the proximal end side Ar2 protrudes to the outside of the sheath 6 and is fixed to the incision operating unit 16.

The second link mechanism 172 is a mechanism that interlocks the incision mechanism 17 with the bending operation of the end effector 7D with respect to the sheath 6. More specifically, as illustrated in FIG. 23, the second link mechanism 172 includes a plurality of (five in the present embodiment) connecting pieces 1721.

As illustrated in FIG. 23, the plurality of connecting pieces 1721 are continuously provided so as to be rotatable about a plurality (four in the present embodiment) of seventh rotation axes Rx7 parallel to each other. In addition, an end portion of the plurality of connecting pieces 1721 on the proximal end side Ar2 is connected to the end portion of the third drive rod 171 on the distal end side Ar1 so as to be rotatable about an eighth rotation axis Rx8. Further, an end portion of the plurality of connecting pieces 1721 on the distal end side Ar1 is connected to the cutter base 151 so as to be rotatable about a ninth rotation axis Rx9. The seventh to ninth rotation axes Rx7 to Rx9 are axes substantially parallel to the sixth rotation axis Rx6.

Then, the incision mechanism 17 operates as described below according to the incision operation on the incision operating unit 16 by the operator.

When the incision operating unit 16 is operated (incision operation) in the left direction in FIG. 21 by the operator, the operation force is transmitted to the third drive rod 171. Then, the third drive rod 171 moves toward the distal end side Ar1 along the central axis Ax, and pushes the cutter 15 toward the distal end side Ar1 via the second link mechanism 172. As a result, the cutter 15 moves toward the distal end side Ar1 and incises the target site gripped between the first and second grippers 8D and 9D.

On the other hand, in a case where the incision operating unit 16 is operated rightward in FIG. 21 by the operator, the third drive rod 171 moves in a direction opposite to the above. Thus, the cutter 15 is positioned at the position of the proximal end side Ar2 in the first gripper 8.

Figure 24:
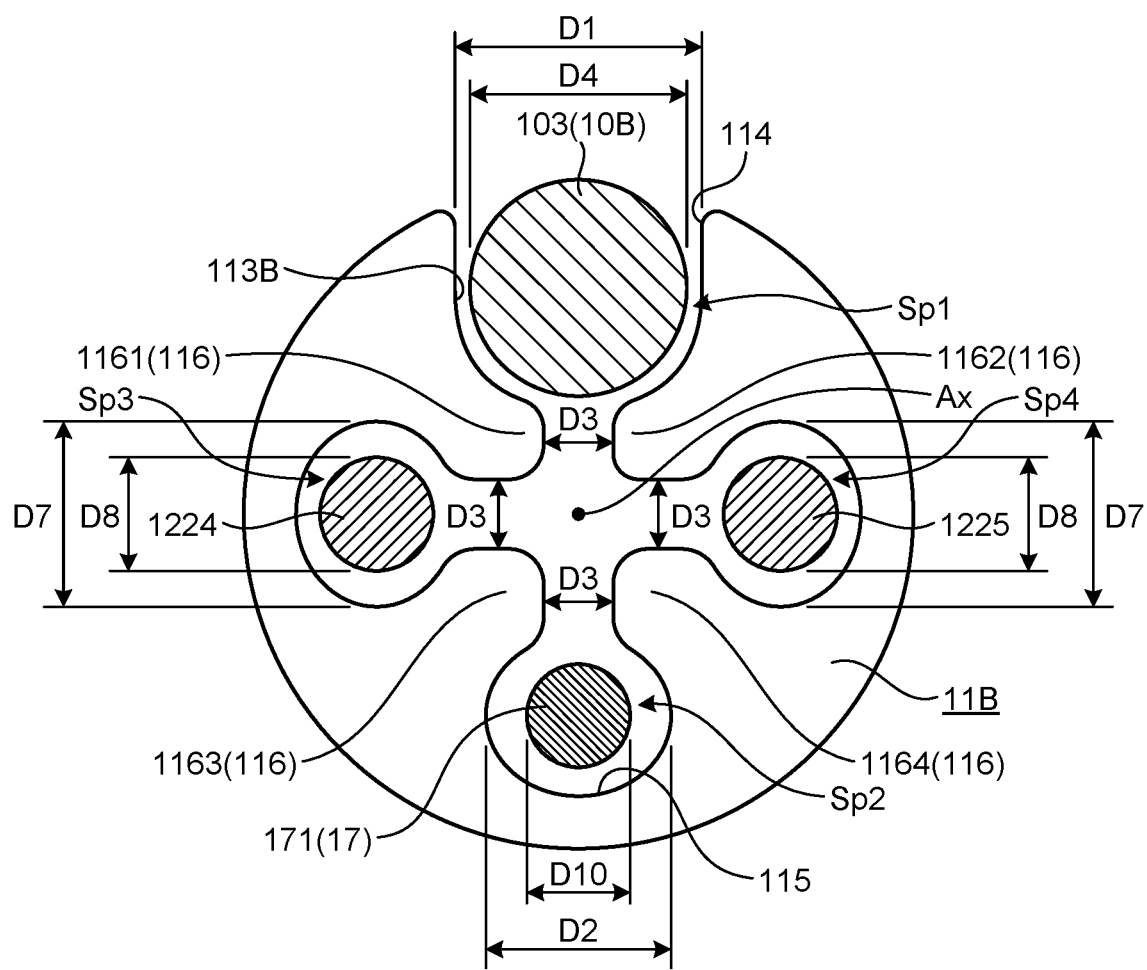
FIG. 24 is a diagram illustrating a configuration of a holder.

FIG. 24 is a diagram illustrating a configuration of the holder 11B. Specifically, FIG. 24 is a sectional view corresponding to FIG. 15.

Since the first and second electrically conductive wires CA1 and CA2 are omitted, the third drive rod 171 is disposed in the second region Sp2 of the holder 11B as illustrated in FIG. 24. Here, in a cross section perpendicular to the central axis Ax, a maximum width D10 of the third drive rod 171 is larger than the distance D3 and smaller than the second width D2.

A method of manufacturing the treatment tool 1D according to the present embodiment is different from the method of manufacturing the treatment tool 1B described in the aforementioned embodiment (FIG. 16) only in that the third drive rod 171 is arranged in the holder 11 (second region Sp2) instead of the first and second electrically conductive wires CA1 and CA2 in Step S1B.

Further, since a reprocessing method of the treatment tool 1D according to the present embodiment is similar to the reprocessing method (FIG. 6) of the treatment tool 1 described in the aforementioned embodiment, the description thereof will be omitted.

According to the present embodiment described above, effects similar to those of the embodiment described above are obtained.

Next, another exemplary embodiment will be described.

In the following description, the same reference numerals are given to the same components as those of the embodiment described above with respect to FIGS. 1-6, and a detailed description thereof will be omitted or simplified.

Figure 25:
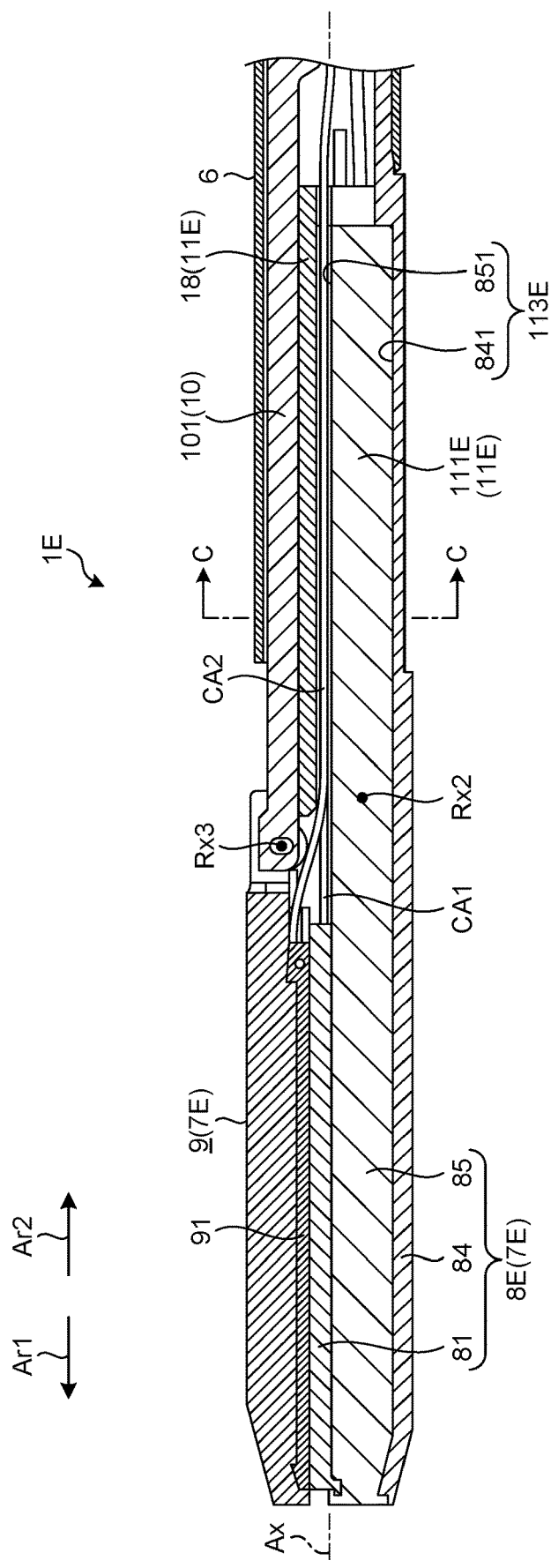
FIG. 25 is a diagram illustrating a configuration of a treatment tool according to an exemplary embodiment.
Figure 26:
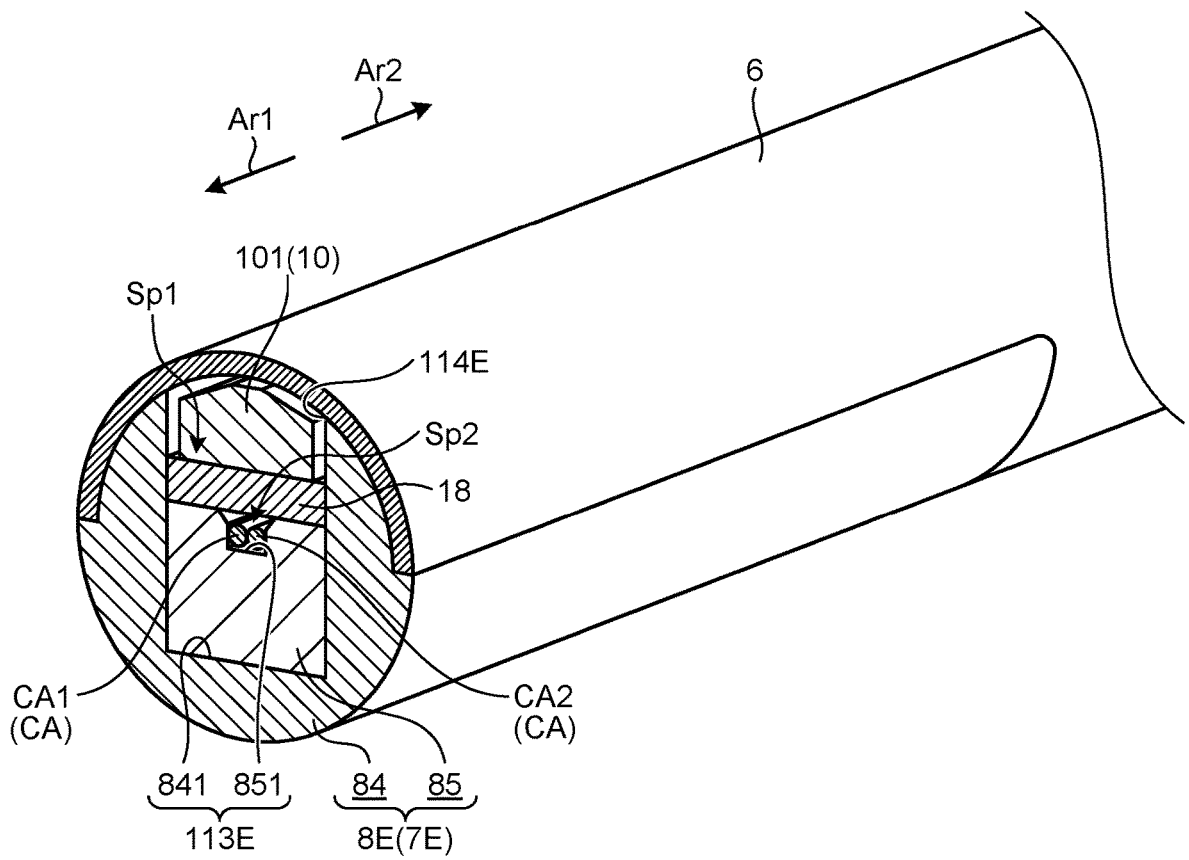
FIG. 26 is a diagram illustrating the configuration of the treatment tool.

FIGS. 25 and 26 are diagrams illustrating a configuration of a treatment tool 1E according to the present embodiment. Specifically, FIG. 25 is a sectional view corresponding to FIG. 3, and is the-sectional view obtained by cutting the distal end portion of the treatment tool 1E along a plane including the central axis Ax. FIG. 26 is a diagram illustrating a cross section taken along line C-C in FIG. 25.

As illustrated in FIG. 25 or 26, the treatment tool 1E according to the present embodiment is partially different in a configuration from the treatment tool 1 described in the aforementioned embodiment.

As illustrated in FIG. 25 or 26, the treatment tool 1E is different from the treatment tool 1 described in the above embodiment in the following points. Specifically, the treatment tool 1E adopts an end effector 7E (FIG. 25 and FIG. 26) having a configuration different from that of the end effector 7. In addition, the holder 11 is not provided in the treatment tool 1E, and a lid 18 (FIG. 25 and FIG. 26) is added.

The end effector 7E corresponds to the treatment portion. As illustrated in FIG. 25 or 26, the end effector 7E is different from the end effector 7 described in the above embodiment in that a first gripper 8E having a configuration different from that of the first gripper 8 is adopted.

As illustrated in FIG. 25 or 26, the first gripper 8E includes a gripper body 84, a reinforcing portion 85, and the first electrode 81 (FIG. 25) described in the aforementioned embodiment.

The gripper body 84 has an elongated shape extending along the central axis Ax. A length of the gripper body 84 in the longitudinal direction is longer than the length of the second gripper 9 in the longitudinal direction. Then, an end portion of the gripper body 84 on the proximal end side Ar2 is fixed to the sheath 6. In addition, an end portion of the second gripper 9 on the proximal end side Ar2 is connected to the gripper body 84 so as to be rotatable about the second rotation axis Rx2 (FIG. 25).

The gripper body 84 is provided with a first groove 841 (FIG. 25, FIG. 26) over the entire length of the gripper body 84.

The reinforcing portion 85 has an elongated shape extending along the central axis Ax. A length of the reinforcing portion 85 in the longitudinal direction is substantially the same as the length of the gripper body 84 in the longitudinal direction. The reinforcing portion 85 is disposed in the first groove 841 to reinforce the gripper body 84.

The reinforcing portion 85 is provided with a second groove 851 (FIG. 25 and FIG. 26) over the entire length of the reinforcing portion 85. Then, as illustrated in FIG. 25 or 26, the first and second electrically conductive wires CA1 and CA2 bonded to and extending from the first and second electrodes 81 and 91, respectively, are inserted into the second groove 851 while keeping a posture of the first and second electrically conductive wires CA1 and CA2 in the longitudinal direction substantially parallel to the longitudinal direction of the second groove 851.

The first electrode 81 is provided at an end portion of the reinforcing portion 85 on the distal end side Ar1 facing the second gripper 9.

In the gripper body 84 and the reinforcing portion 85 described above, a portion on the proximal end side Ar2 with respect to the central position in the longitudinal direction has a function as a base body 111E (FIG. 25). The first and second grooves 841 and 851 in the base body 111E function as a groove 113E (FIG. 25 and FIG. 26). Furthermore, in the groove 113E, the inside of the second groove 851 corresponds to the second region Sp2 (FIG. 26). In the groove 113E, a region above the second region Sp2 in FIG. 26 corresponds to the first region Sp1 (FIG. 26).

The lid 18 corresponds to the intervening portion. In other words, the base body 111C and the lid 18 correspond to a holder 11E (FIG. 25 and FIG. 26). The lid 18 is formed of a plate having a length substantially equal to the length of the base body 111C in the longitudinal direction, and is disposed in the first groove 841 in a posture of blocking the second groove 851.

Next, a method of manufacturing the treatment tool 1E according to the present embodiment will be described.

Figure 27:
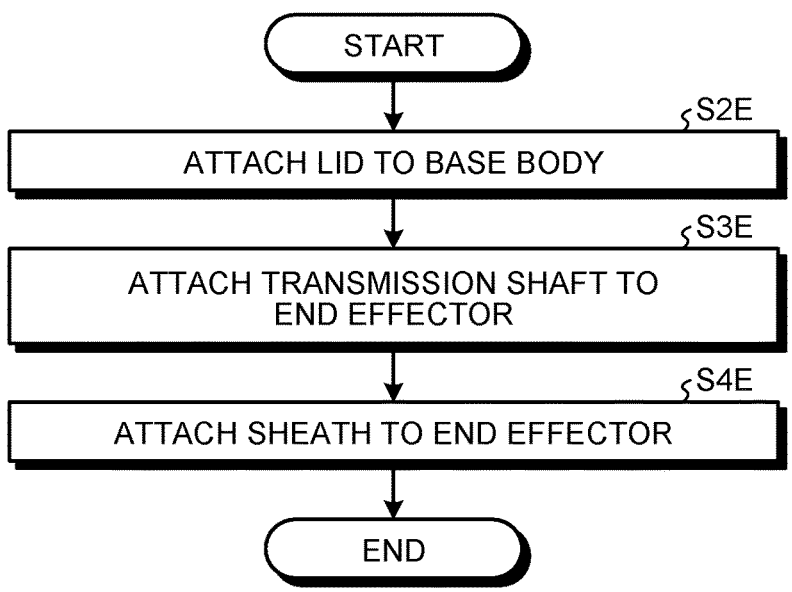
FIG. 27 is a flowchart illustrating a method of manufacturing the treatment tool.
Figure 28:
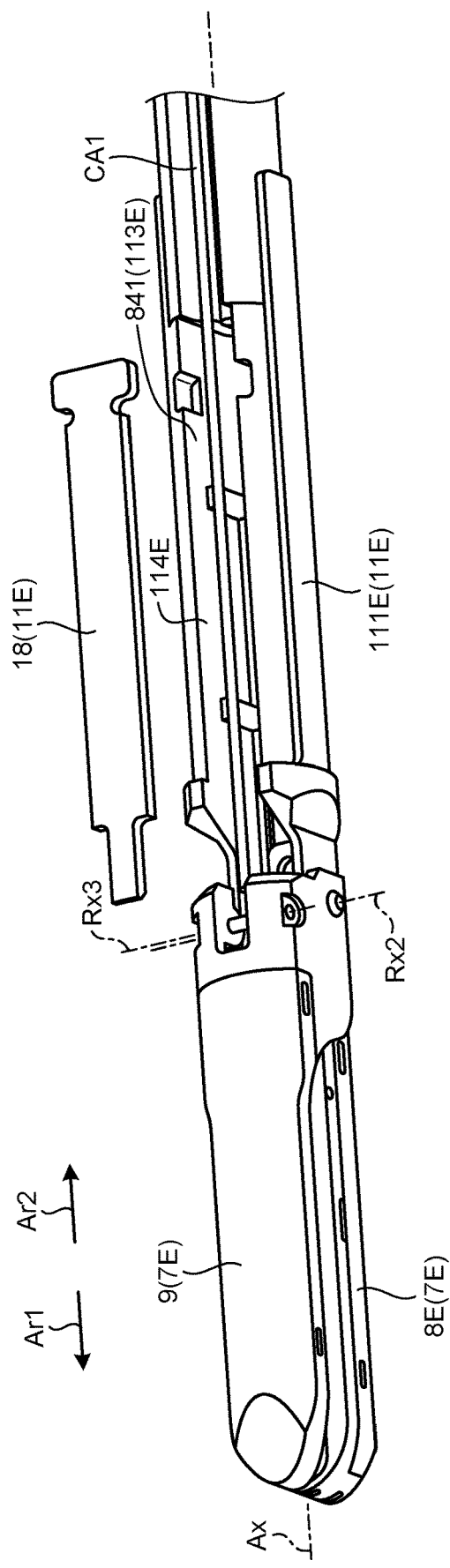
FIG. 28 is a diagram illustrating the method of manufacturing the treatment tool.
Figure 29:
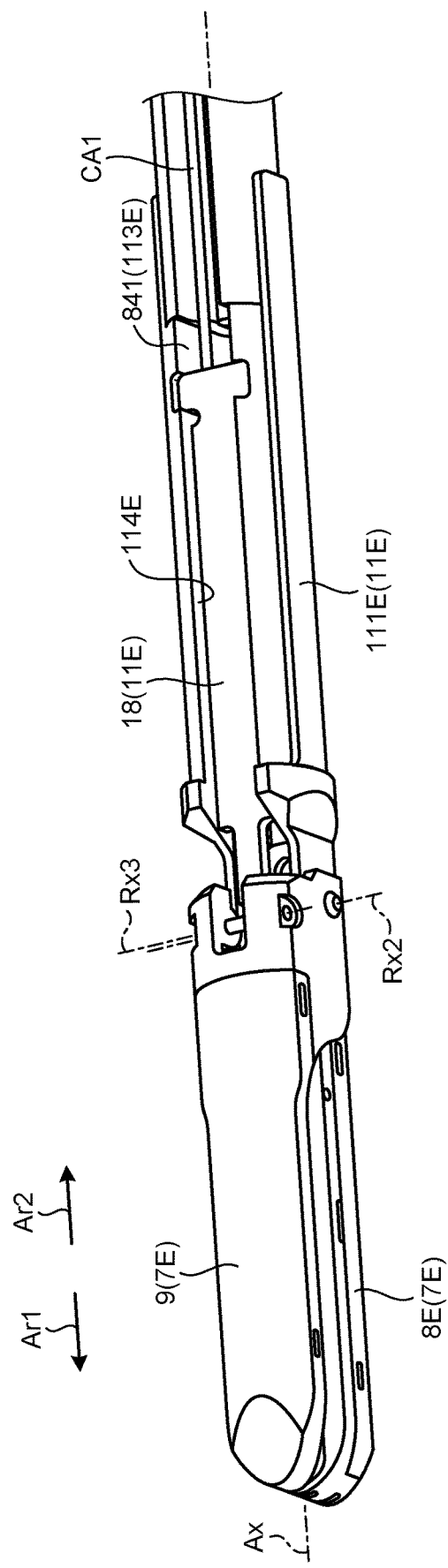
FIG. 29 is a diagram illustrating the method of manufacturing the treatment tool.

FIG. 27 is a flowchart illustrating the method of manufacturing the treatment tool 1E. FIGS. 28 and 29 are diagrams illustrating the method of manufacturing the treatment tool 1E. Note that, in FIGS. 28 and 29, the reinforcing portion 85 is not illustrated for convenience of description. Further, in FIGS. 28 and 29, only the first electrically conductive wire CA1 in the first and second electrically conductive wires CA1 and CA2 is illustrated for convenience of description.

As illustrated in FIG. 27, the method of manufacturing the treatment tool 1E according to the present embodiment is different from the method of manufacturing the treatment tool 1 (FIG. 5) described in the aforementioned embodiment in the following points. Specifically, Step S1 is not performed in the method of manufacturing the treatment tool 1E. In the method of manufacturing the treatment tool 1E, Steps S2E to S4E are adopted instead of Steps S2 to S4.

In Step S2E, the worker attaches the lid 18 to the base body 111E.

Specifically, in Step S2E, as illustrated in FIGS. 28 and 29, the worker inserts the lid 18 into the groove 113E through an opening 114E of the groove 113E, and disposes the lid body in the first region Sp1 in a posture of blocking the second region Sp2 (posture of confining first and second electrically conductive wires CA1 and CA2 in second region Sp2).

After Step S2E, the worker attaches the transmission shaft 101 to the end effector 7E (Step S3E).

Specifically, in Step S3E, the worker inserts the transmission shaft 101 into the groove 113E through the opening 114E and arranges the transmission shaft 101 in the first region Sp1 while keeping a posture of the transmission shaft 101 in the longitudinal direction substantially parallel to the longitudinal direction of the base body 111E. In other words, the lid 18 is disposed between the first and second electrically conductive wires CA1 and CA2 and the transmission shaft 101. Then, the worker connects the end portion of the transmission shaft 101 on the distal end side Ar1 to the second gripper 9 so as to be rotatable about the third rotation axis Rx3.

After Step S3E, the worker attaches the sheath 6 to the end effector 7E (Step S4E).

Specifically, in Step S4E, the worker inserts an end portion of the base body 111E on the proximal end side Ar2 into the sheath 6 from an end portion of the sheath 6 on the distal end side Ar1. Then, the worker bonds the end portion of the sheath 6 on the distal end side Ar1 and the base body 111E.

According to the present embodiment described above, effects similar to those of the embodiment described above are obtained.

Other Embodiments

Although the embodiments for carrying out the disclosure have been described so far, the disclosure is not be limited only by the aforementioned embodiments.

In the aforementioned embodiments, such as those discussed with respect to FIGS. 1-20 and 25-29, the high frequency energy is exemplified as the treatment energy applied to the target site, but the treatment energy is not limited thereto, and thermal energy, ultrasonic energy, or the like may be adopted. Here, "applying thermal energy to the target site" means that heat of a heater or the like is transferred to the target site. In addition, "applying ultrasonic energy to the target site" means that ultrasonic vibration is applied to the target site.

Note that, in the aforementioned embodiment discussed with respect to FIGS. 21-24, as in the other embodiments, the configuration to apply treatment energy of at least one of high frequency energy, heat energy, and ultrasonic energy to the target site may be adopted. Further, in the aforementioned embodiment discussed with respect to FIGS. 21-24, a configuration that omits the cutter 15, the incision operating unit 16, and the incision mechanism 17, i.e., a configuration as forceps only for gripping the target site, may be adopted.

A treatment tool, a method of manufacturing the treatment tool, and a method of reprocessing the treatment tool according to the disclosure facilitate disassembly and assembly while a contact between first and second drivers is avoided.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A treatment tool comprising:
   a sheath;
   a treatment portion that is provided at a distal end of the sheath, and is configured to treat a living tissue;
   a first driver inserted in the sheath, the first driver being configured to drive the treatment portion;
   a second driver inserted in the sheath, the second driver being configured to drive the treatment portion; and
   a holder that is inserted in the sheath, and holds the first driver and the second driver, wherein
   the holder includes
      a groove extending along a longitudinal direction from a distal end to a proximal end of the holder, the first driver and the second driver being inserted in the groove, and
      an intervening portion provided in the groove and arranged between the first driver and the second driver in a cross section perpendicular to the longitudinal direction of the groove.

2. The treatment tool according to claim 1, wherein
   the groove includes a first region and a second region in the cross section perpendicular to the longitudinal direction, the second region being provided on a closed side of the groove with respect to the first region, the closed side of the groove being on a side opposite to an opening of the groove,
   the first region is a region in which a width of the groove is a first width in the cross section perpendicular to the longitudinal direction, and the second region is a region in which a width of the groove is a second width smaller than the first width in the cross section perpendicular to the longitudinal direction.

3. The treatment tool according to claim 2, wherein the holder includes
a first portion that includes the groove, and
a second portion inserted in the groove, the second portion forming the intervening portion,
the first width is a maximum width of the groove in the first region, and
the second width is a maximum width of the groove in the second region.

4. The treatment tool according to claim 2, wherein
the intervening portion includes a pair of protrusions on inner wall surfaces of the groove facing each other at a position between the first region and the second region, the pair of protrusions protruding in a direction approaching each other,
the first width is a maximum width of the groove in the first region,
the second width is a maximum width of the groove in the second region, and
a distance between distal ends of the pair of protrusions is smaller than the second width.

5. The treatment tool according to claim 1, wherein
one of the first driver and the second driver is an electrically conductive wire configured to supply electric power to the treatment portion so the treatment portion can apply treatment energy to the living tissue, and
the holder has rigidity higher than a rigidity of the electrically conductive wire and has an electric insulation property.

6. The treatment tool according to claim 1, wherein
one of the first driver and the second driver is configured to transmit any one of:
a driving force to open and close a pair of jaws comprised by the treatment portion,
a driving force to rotate the treatment portion with respect to the sheath, and
a driving force to advance and retract an incision portion provided in the treatment portion to incise the living tissue.

7. The treatment tool according to claim 1, wherein
one of the first driver and the second driver is a transmission shaft that is configured to transmit a driving force to move at least a portion of the treatment portion.

8. The treatment tool according to claim 1, wherein the intervening portion is arranged between the first driver and the second driver in a groove depth direction extending from an opening of the groove to a closed end of the groove, the groove depth direction being orthogonal to the longitudinal direction.

9. The treatment tool according to claim 8, wherein
the groove further includes a pair of protrusions on inner wall surfaces of the groove that face each other and protrude in a protruding direction approaching each other,
the pair of protrusions are arranged between the first driver and the second driver in the groove depth direction, and
the groove depth direction is transverse to the protruding direction of the pair of protrusions.

10. The treatment tool according to claim 1, wherein the intervening portion is a cylindrical member inserted into the groove so as to extend along the longitudinal direction of the groove.

11. The treatment tool according to claim 10, wherein
the groove includes a first region and a second region in the cross section perpendicular to the longitudinal direction, the second region being provided on a closed side of the groove with respect to the first region, the closed side of the groove being on a side opposite to an opening of the groove,
the first region includes a first width that is a maximum width of the groove in the first region,
the second region includes a second width that is a maximum width of the groove in the second region, the second width being smaller than the first width, and
the cylindrical member has a diameter smaller than the second width.

12. A method of manufacturing a treatment tool including a sheath, a treatment portion that is provided at a distal end of the sheath and is configured to treat a living tissue, a first driver inserted in the sheath, the first driver being configured to drive the treatment portion, a second driver inserted in the sheath, the second driver being configured to drive the treatment portion, and a holder inserted in the sheath and including a groove extending along a longitudinal direction from a distal end to a proximal end of the holder, the method comprising:
setting a state in which the first driver and the second driver are inserted in the groove and an intervening portion is arranged between the first driver and the second driver in a cross section perpendicular to the longitudinal direction of the groove; and
inserting the holder into the sheath.

13. A method of reprocessing a treatment tool including a sheath, a treatment portion that is provided at a distal end of the sheath and is configured to treat a living tissue, a first driver inserted in the sheath, the first driver being configured to drive the treatment portion, a second driver inserted in the sheath, the second driver being configured to drive the treatment portion, and a holder inserted in the sheath and including a groove extending along a longitudinal direction from a distal end to a proximal end of the holder, the method comprising:
removing the holder from an inside of the sheath;
detaching the first driver and the second driver from the groove in which the first driver and the second driver are inserted in a state in which an intervening portion is arranged between the first driver and the second driver in a cross section perpendicular to the longitudinal direction of the groove, the first driver and the second driver being detached in order from a side close to an opening of the groove; and
replacing the holder with another holder.

* * * * *